(12) United States Patent
Choi et al.

(10) Patent No.: US 11,206,101 B2
(45) Date of Patent: Dec. 21, 2021

(54) DOWNLINK CONTROL CHANNEL DECODING METHOD AND DEVICE FOR LOW POWER CONSUMPTION IN WIRELESS COMMUNICATION SYSTEM

(71) Applicant: Samsung Electronics Co., Ltd., Suwon-si (KR)

(72) Inventors: Seung-Hoon Choi, Seongnam-si (KR); Young-Woo Kwak, Suwon-si (KR); Young-Bum Kim, Seoul (KR); Tae-Hyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 16/632,109

(22) PCT Filed: Jul. 17, 2018

(86) PCT No.: PCT/KR2018/008079
§ 371 (c)(1),
(2) Date: Jan. 17, 2020

(87) PCT Pub. No.: WO2019/017678
PCT Pub. Date: Jan. 24, 2019

(65) Prior Publication Data
US 2020/0177306 A1    Jun. 4, 2020

(30) Foreign Application Priority Data
Jul. 17, 2017  (KR) .................. 10-2017-0090313

(51) Int. Cl.
*H04L 1/00* (2006.01)
*H04W 76/11* (2018.01)
*H04W 72/04* (2009.01)

(52) U.S. Cl.
CPC .......... *H04L 1/0038* (2013.01); *H04W 72/042* (2013.01); *H04W 72/0453* (2013.01); *H04W 76/11* (2018.02)

(58) Field of Classification Search
CPC ... H04W 72/042; H04W 72/14; H04W 76/11; H04W 72/0453; H04L 5/0053;
(Continued)

(56) References Cited

U.S. PATENT DOCUMENTS

2010/0279628 A1* 11/2010 Love .................. H04L 5/0091
                                                  455/70
2013/0183987 A1   7/2013 Vrzic et al.
(Continued)

FOREIGN PATENT DOCUMENTS

EP          2 639 989 A1    9/2013
KR    10-2014-0024208 A     2/2014
(Continued)

OTHER PUBLICATIONS

Extended European Search Report dated Jun. 25, 2020, issued in European Application No. 18835758.6.
Intel Corporation, 'Considerations on blind decoding for NR PDCCH', R1-1707382, 3GPP TSG RAN WG1 Meeting #89, Hangzhou, P.R. China, May 7, 2017.
(Continued)

*Primary Examiner* — Dady Chery
(74) *Attorney, Agent, or Firm* — Jefferson IP Law, LLP

(57) ABSTRACT

Disclosed in one embodiment is a downlink control channel decoding method of a wireless communication system, comprising the steps of: receiving setting information on a first resource and a second resource; blind-decoding reception signals on PDCCH resource candidates within the first resource determined by the setting information, so as to search for a PDCCH of the first resource; and blind-decoding reception signals on PDCCH resource candidates within
(Continued)

the second resource determined by the setting information, and by blind-decoding, among the resource candidates, the remaining one or more resource candidates excluding one or more resource candidates, which include a resource area overlapping with the PDCCH having been searched for, so as to search for a PDCCH of the second resource. Therefore, since the number of PDCCH resource candidates required for blind-decoding is adjusted on the basis of an overlapping resource area, power consumption of a terminal can be reduced.

14 Claims, 12 Drawing Sheets

(58) Field of Classification Search
CPC ..... H04L 5/0023; H04L 1/0038; H04L 5/001; H04L 5/0048; H04L 5/0094; H04L 1/0046; H04L 1/0072; H04L 1/00
See application file for complete search history.

(56) References Cited

U.S. PATENT DOCUMENTS

| | | | |
|---|---|---|---|
| 2014/0071918 A1* | 3/2014 | Park | H04L 5/0053 370/329 |
| 2014/0376457 A1 | 12/2014 | Feng et al. | |
| 2016/0366670 A1 | 12/2016 | Feng et al. | |

FOREIGN PATENT DOCUMENTS

| | | |
|---|---|---|
| KR | 10-2014-0138007 A | 12/2014 |
| KR | 10-2018-0123417 A | 11/2018 |
| WO | 2018/227543 A1 | 12/2018 |

OTHER PUBLICATIONS

Interdigital Inc., 'PDCCH Blind decoding in NR', R1-1709003, 3GPP TSG RAN WG1 Meeting #89, Hangzhou, P.R. China, May 6, 2017.
Korean Examination report dated Sep. 14, 2021, issued in Korean Application No. 10-2017-0090313.

* cited by examiner

DOWNLINK CONTROL CHANNEL DECODING METHOD AND DEVICE FOR LOW POWER CONSUMPTION IN WIRELESS COMMUNICATION SYSTEM

CROSS-REFERENCE TO RELATED APPLICATION(S)

This application is a National Phase Entry of PCT International Application No. PCT/KR2018/008079, which was filed on Jul. 17, 2018 and claims priority to Korean Patent Application No. 10-2017-0090313, which was filed on Jul. 17, 2017, the contents of which are incorporated herein by reference.

FIELD

The present disclosure relates to a wireless communication system, and more particularly, to a method and apparatus to decode a downlink control channel in a wireless communication system.

DESCRIPTION OF THE RELATED ART

To schedule transmission of downlink and uplink transmission channels in a wireless communication system, downlink control information (DCI) related thereto is required. The DCI includes resource configuration information for a terminal or a terminal group and other control information.

In a conventional long term evolution (LTE) communication system, DCI is transmitted through a downlink control channel, i.e., a physical downlink control channel (PDCCH). The PDCCH is transmitted in every subframe across an entire transmission band, and one PDCCH carries one DCI message. A plurality of terminals may be simultaneously scheduled in a downlink and an uplink and thus, a plurality of PDCCHs are simultaneously transmitted in each cell.

A cell-specific reference signal (CRS), which is a common reference signal in a cell, is used as a reference signal (RS) for decoding a PDCCH. The CRS is an always-on signal transmitted in every subframe across an entire system band, and scrambling and resource mapping for the CRS are changed based on a cell identity (ID).

All terminals which monitor a PDCCH estimate a channel using a CRS, and perform decoding for the PDCCH. A terminal performs blind-decoding for a specific resource area which is defined as a search space upon decoding the PDCCH. The search space of the PDCCH is defined as a set of resource candidates through which the PDCCH may be transmitted for various aggregation levels (ALs).

Unlike a conventional communication system, a 5G or a new radio (NR) communication system will support a service having significantly short transmission delay and a service that requires high connection density, in addition to a service that requires a high transmission speed. These scenarios need to provide various services with different transmission/reception schemes and different transmission/reception parameters in one system in order to satisfy various user requirements and services. That is, it is important to be designed in consideration of forward compatibility such that an added service is not restricted by a current system. Unlike conventional LTE, time/frequency resources need to be more flexibly utilized in 5G. Particularly, one of the most important things is to secure flexibility in designing a downlink control channel.

For this purpose, in the 5G communication system, the downlink control channel may be transmitted on a specific subband without being transmitted across an entire system band, and a time/frequency resource through which the downlink control channel is transmitted may be configured for each terminal.

A plurality of time/frequency resources through which a downlink control channel is transmitted, i.e., a plurality of downlink control channel resources (hereinafter, it will be referred to as control resource sets (CORESETs)) may be configured to a terminal through a higher signal. The terminal receives the higher signal, and decodes the downlink control channel within the configured CORESETs. By configuring a plurality of CORESETs which may be transmitted on a downlink control channel to one terminal, collision probability for a transmission location of a downlink control channel which may be transmitted to each terminal may be decreased when a plurality of terminals are simultaneously scheduled on the downlink control channel.

Meanwhile, upon configuring a plurality of CORESETs to one terminal, a base station may configure the CORESETs such that the CORESETs overlap in a time/frequency resource. When there is data to be transmitted, the base station may operate such that the CORESETs of the one terminal overlap in the time/frequency resource by considering a freedom degree for free scheduling and preventing transmission collision for the downlink control channel, and the number of terminals within a cell. If the plurality of CORESETs configured to the one terminal do not overlap in the time/frequency resource, it may be difficult to configure a plurality of CORESETs for all terminals within the cell in a case of considering limited time/frequency resources. So, upon configuring the plurality of CORESETs to the one terminal, the base station may configure the CORESETs such that the CORESETs overlap in the time/frequency resource. The terminal blind-decodes the configured CORESETs configured by a higher signal.

Monitoring of a downlink control channel which a terminal needs to perform need to be always performed in a slot based on a channel monitoring period and an offset set by a base station. Blind-decoding for a downlink control channel in each slot is determined by a standard or needs to be performed a number of times set by a higher signal, so it greatly affects power consumption of a terminal. So, a blind-decoding scheme for a downlink control channel is required to reduce power consumption of a terminal.

DETAILED DESCRIPTION OF THE INVENTION

Summary

The present disclosure provides a method and apparatus which may reduce power consumption of a terminal required for decoding a downlink control channel in a case that a plurality of CORESETs are configured for the terminal in a wireless communication system.

The present disclosure provides a method and apparatus which may reduce a resource region which needs to blind-decode and the number of decoding according to whether a search for a downlink control channel is successful on an overlapped resource region in a case that a plurality of CORESETs configured for a terminal overlap in a time/frequency domain.

According to an embodiment of the present disclosure, there is provided a method to decode a physical downlink control channel (PDCCH) in a wireless communication system, the method comprising: receiving configuration information about a first resource and a second resource; blind-decoding received signals on PDCCH resource candidates within the first resource identified based on the configuration information to search for a PDCCH of the first resource; and blind-decoding received signals on one or more remaining resource candidates except for one or more resource candidates including a resource region which overlaps with the searched PDCCH of the first resource among the PDCCH resource candidates within the second resource to search for a PDCCH of the second resource in a case of blind-decoding received signals on PDCCH resource candidates within the second resource identified based on the configuration information.

The method according to an embodiment of the present disclosure may further comprise identifying whether a resource region of the first resource and a resource region of the second resource at least partially overlap based on the configuration information.

In the method according to an embodiment of the present disclosure, searching for the PDCCH of the second resource may comprise identifying whether a resource of the searched PDCCH among the first resource includes a resource region which overlaps with the second resource in a case that a resource region of the first resource and a resource region of the second resource at least partially overlap; re-determining PDCCH resource candidates such that one or more resource candidates including the overlapped resource region are excluded from the PDCCH resource candidates of the second resource configured based on the configuration information; and blind-decoding received signals on the re-determined PDCCH resource candidates to search for the PDCCH of the second resource.

In the method according to an embodiment of the present disclosure, the PDCCH resource candidates of the first resource which exist in a first-type search space and the PDCCH resource candidates of the second resource which exist in a second-type search space may be identified based on the configuration information, and blind-decoding may be skipped for one or more resource candidates including a resource region among the PDCCH resource candidates of the second resource in a case that the PDCCH of the first resource is searched in the resource region in which the first-type search space and the second-type search space at least partially overlap.

In the method according to an embodiment of the present disclosure, a search space type designated based on the configuration may be one of a common search space, a terminal-specific search space (UE-specific search space), and a terminal-group search space (UE-group search space).

In the method according to an embodiment of the present disclosure, the PDCCH resource candidates of the first resource or the second resource may be sequentially blind-decoded.

In the method according to an embodiment of the present disclosure, blind-decoding may be initiated from a specific PDCCH resource candidate among the PDCCH resource candidates of the first resource or the second resource based on a terminal identifier (radio network temporary identifier (RNTI)) or a slot index.

In the method according to an embodiment of the present disclosure, the first resource and the second resource may be allocated by a unit of control-channel element (CCE), the PDCCH resource candidates of the first resource and the PDCCH resource candidates of the second resource may be identified based on a set of CCEs configured based on CCE information included in the configuration information, and blind-decoding for PDCCH resource candidates including an overlapped CCE may be skipped in a case that the overlapped CCE exists in a CCE set of the first resource and a CCE set of the first resource.

In the method according to an embodiment of the present disclosure, the downlink control channel may be an enhanced PDCCH (E-PDCCH), the first resource and the second resource may be allocated by a unit of physical resource block (PRB) pair, an enhanced control-channel element (ECCE) may be generated from information about a first PRB pair and a second PRB pair included in the configuration information, and enhanced PDCCH (E-PDCCH) resource candidates of the first resource and E-PDCCH resource candidates of the second resource may be identified from a set of ECCEs, and blind-decoding for PDCCH resource candidates of a PRB pair including an overlapped resource region may be skipped in a case that there is the overlapped PRB on a PPB pair of the first resource and a PPB pair of the second resource.

According to an embodiment of the present disclosure, there is provided an apparatus to decode a physical downlink control channel (PDCCH) in a wireless communication system, the apparatus comprising: a transceiver configured to receive configuration information about a first resource and a second resource; and a processor configured to blind-decode received signals on PDCCH resource candidates within the first resource identified based on the configuration information to search for a PDCCH of the first resource, and to blind-decode received signals on one or more remaining resource candidates except for one or more resource candidates including a resource region which overlaps with the searched PDCCH among the resource candidates to search for a PDCCH of the second resource in a case of blind-decoding received signals on PDCCH resource candidates within the second resource identified based on the configuration information.

In the apparatus according to an embodiment of the present disclosure, the processor may be configured to identify whether a resource region of the first resource and a resource region of the second resource at least partially overlap based on the configuration information.

In the apparatus according to an embodiment of the present disclosure, in a case of searching for the PDCCH of the second resource, the processor may be configured to identify whether a resource of the searched PDCCH among the first resource includes a resource region which overlaps with the second resource in a case that a resource region of the first resource and a resource region of the second resource at least partially overlap; re-determine PDCCH resource candidates such that one or more resource candidates including the overlapped resource region are excluded from the PDCCH resource candidates of the second resource configured based on the configuration information; and blind-decode received signals on the re-determined PDCCH resource candidates to search for the PDCCH of the second resource.

In the apparatus according to an embodiment of the present disclosure, the processor may be configured to identify the PDCCH resource candidates of the first resource which exist in a first-type search space and the PDCCH resource candidates of the second resource which exist in a second-type search space based on the configuration information, and skip blind-decoding for one or more resource candidates including a resource region among the PDCCH resource candidates of the second resource in a case that the PDCCH of the first resource is searched in the resource region in which the first-type search space and the second-type search space at least partially overlap.

In the apparatus according to an embodiment of the present disclosure, a search space type designated based on the configuration may be one of a common search space, a terminal-specific search space (UE-specific search space), and a terminal-group search space (UE-group search space).

In the apparatus according to an embodiment of the present disclosure, the processor may be configured to sequentially blind-decode the PDCCH resource candidates of the first resource or the second resource.

In the apparatus according to an embodiment of the present disclosure, the processor may be configured to initiate blind-decoding from a specific PDCCH resource candidate among the PDCCH resource candidates of the first resource or the second resource based on a terminal identifier (radio network temporary identifier (RNTI)) or a slot index.

In the apparatus according to an embodiment of the present disclosure, the first resource and the second resource may be allocated by a unit of control-channel element (CCE), the PDCCH resource candidates of the first resource and the PDCCH resource candidates of the second resource may be identified based on a set of CCEs configured based on CCE information included in the configuration information, and blind-decoding for PDCCH resource candidates including an overlapped CCE may be skipped in a case that the overlapped CCE exists in a CCE set of the first resource and a CCE set of the first resource.

In the apparatus according to an embodiment of the present disclosure, the downlink control channel may be an enhanced PDCCH (E-PDCCH), the first resource and the second resource may be allocated by a unit of physical resource block (PRB) pair, an enhanced control-channel element (ECCE) may be generated from information about a first PRB pair and a second PRB pair included in the configuration information, and enhanced PDCCH (E-PDCCH) resource candidates of the first resource and E-PDCCH resource candidates of the second resource may be identified from a set of ECCEs, and blind-decoding for PDCCH resource candidates of a PRB pair including an overlapped resource region may be skipped in a case that there is the overlapped PRB on a PPB pair of the first resource and a PPB pair of the second resource.

According to the present disclosure, power consumption of a terminal required for decoding a downlink control channel may be reduced in a case that a plurality of CORESETs are configured for the terminal in a wireless communication system.

According to the present disclosure, a resource region which needs to blind-decode and the number of decoding according to whether a search for a downlink control channel is successful on an overlapped resource region may be reduced in a case that a plurality of CORESETs configured for a terminal overlap in a time/frequency domain, and power consumption of a terminal required for blind-decoding may be reduced according to this.

DETAILED DESCRIPTION

Figure 1:
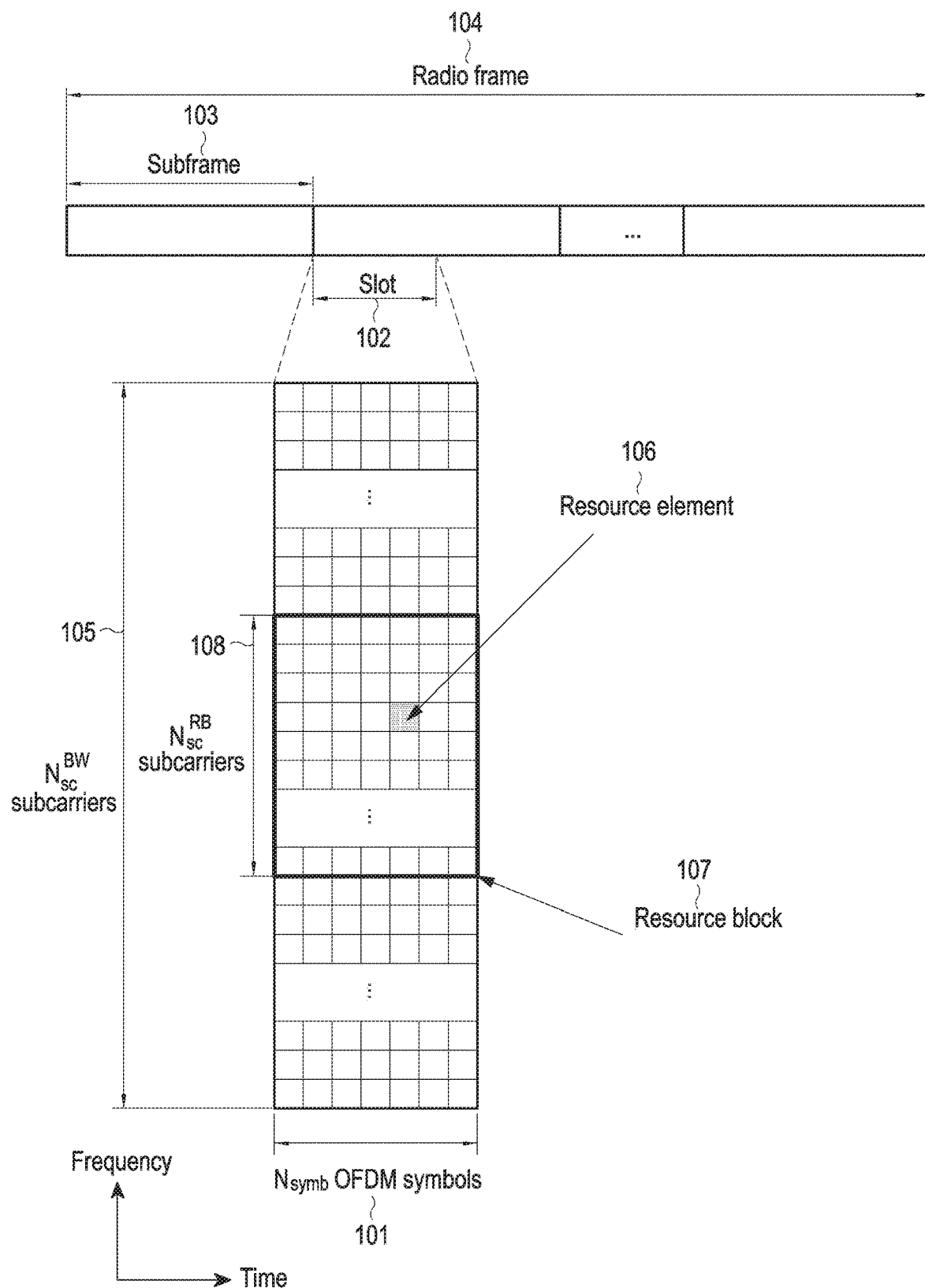
FIG. 1 is a view illustrating a basic structure of a time-frequency domain in an LTE communication system.

In describing the present disclosure, when it is determined that a detailed description of a well known function or configuration may unnecessarily obscure subject matter of the present disclosure, a detailed description thereof will be omitted. For the same reason, in the accompanying drawings, some components may be exaggerated, omitted, or schematically illustrated. Further, a size of each element does not entirely reflect an actual size. In the drawings, identical or corresponding components are provided with identical reference numerals. In addition, terms to be described below are terms defined in consideration of functions in the present disclosure, and may be changed according to user's intention, operator's intention, custom, and/or the like. Therefore, definitions thereof should be made based on contents throughout the specification.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to complete the present disclosure and to completely inform those skilled in the art of the scope of the present disclosure, and the scope of protection of the present disclosure is defined only by the appended claims. Throughout the specification, the same reference numerals designate the same or like elements.

Hereinafter, a frame structure, a downlink control channel, and a scheme of allocating a plurality of resource regions for the downlink channel in a wireless communication system to which embodiments of the present disclosure may be applied will be described with reference to FIGS. 1 to 4. These are for illustrative purposes only, and not intended to limit implementation of the present disclosure, and the present disclosure is applicable to any other wireless communication systems.

In the detailed descriptions of embodiments of the present disclosure and a wireless communication system to which these embodiments may be applied, an OFDM-based wireless communication system, e.g., LTE and 5G (or NR) communication systems will be mainly described. However, the subject matter of the present specifications can be applied to other communication systems having similar technical backgrounds and channel types without departing from the scope of the present disclosure and with slight modification, and the application thereof can be determined by those skilled in the art of the present disclosure.

A wireless communication system has developed into a broadband wireless communication system that provides a high speed and high quality packet data service, such as a communication standard, for example, high speed packet access (HSPA) and long term evolution (LTE) or evolved universal terrestrial radio access (E-UTRA), LTE-advanced (LTE-A), LTE-Pro of 3GPP, high rate packet data (HRPD) and ultra mobile broadband (UMB) of 3GPP2, and 802.16e of IEEE, or the like, beyond the voice-based service provided at the initial stage.

An LTE communication system which is a representative example of a broadband wireless communication system employs an orthogonal frequency division multiplexing (OFDM) scheme for a downlink (DL), and a single carrier frequency division multiple access (SC-FDMA) scheme for an uplink (UL). The uplink denotes a radio link in which a terminal (a user equipment (UE) or a mobile station (MS)) transmits data or a control signal to a base station (an eNode B or a base station (BS)), and the downlink denotes a radio link in which the base station transmits data or a control signal to the terminal. In the multiple access schemes as described above, time-frequency resources for carrying data or control information are allocated and operated in a manner to prevent overlapping of the time-frequency resources, that is, to establish orthogonality between users so as to identify data or control information of each user.

A 5G communication system as a communication system after LTE is required to support a service that simultaneously satisfies various requirements in order to freely reflect various requirements, such as requirements from users, service providers, or the like. Services which are being considered for the 5G communication system include an enhanced mobile broadband (eMBB), a massive machine type communication (mMTC), an ultra reliability low latency communication (URLLC), or the like.

eMBB is to provide an enhanced data rate compared to a data rate supported by conventional LTE, LTE-A or LTE-Pro. For example, in the 5G communication system, eMBB needs to provide a peak data rate of 20 Gbps in the downlink and a peak data rate of 10 Gbps in the uplink from the perspective of one eNB. Also, the 5G communication system needs to provide an enhanced user perceived data rate at the same time as providing a peak data rate. To satisfy the above described requirements, improvement of various transmission and reception technologies including enhanced multi-input multi-output (MIMO) transmission technology is required. Also, LTE conventionally transmits a signal using a maximum transmission bandwidth of 20 MHz in a 2 GHz band, whereas the 5G communication system uses a frequency bandwidth wider than 20 MHz in a frequency band of 3 to 6 GHz or a frequency band of 6 GHz or more, whereby a data rate required by the 5G communication system may be satisfied.

At the same time, mMTC is being considered for the 5G communication system so as to support an application service, such as Internet of Things (IoT). mMTC requires massive terminal access supported in a cell, improvement of a terminal coverage, improved battery time, decrease in expenses of a terminal, and/or the like, so as to efficiently provide IoT. IoT provides a communication function through attachment to various sensors and various devices, whereby IoT needs to support a large number of terminals in a cell (e.g., 1,000,000 terminals/km$^2$). Also, a terminal that supports mMTC has a high probability of being located in a shadow area that is not covered by a cell, such as a basement of a building, due to the characteristic of the service, the terminal requires a larger coverage than other services provided in the 5G communication system. The terminal supporting mMTC needs to be a low-price terminal, and is required to have a significantly long battery life time such as 10 to 15 years since it is difficult to frequently change the battery of the terminal.

URLLC is a mission-critical cellular-based wireless communication service. For example, services used for remotely controlling a robot or machinery, industrial automation, an unmanned aerial vehicle, remote health care, emergency alert, or the like may be considered. Therefore, communication provided by URLLC needs to provide a significantly low latency and significantly high reliability. For example, a service that supports URLLC needs to satisfy an air interface latency less than 0.5 ms and simultaneously to satisfy a packet error rate less than $10^{-5}$. Therefore, for the service supporting URLLC, the 5G communication system needs to be designed to provide a smaller transmit time interval (TTI) than other services, and simultaneously to allocate a wide resource in a frequency band in order to secure the reliability of a communication link.

Three services of 5G, i.e., eMBB, URLLC, and mMTC may be multiplexed and transmitted in one system. At this time, different transmission/reception schemes transmission/reception parameters may be used among services to satisfy different requirements of the services.

A frame structure of LTE and LTE-A communication systems will be described with reference to FIG. 1.

FIG. 1 is a view illustrating a basic structure of a time-frequency domain as a radio resource region in which data or a control channel is transmitted in a downlink of an LTE communication system.

Referring to FIG. 1, a horizontal axis represents a time domain, and a vertical axis represents a frequency domain. In the time domain, a minimum transmission unit is an OFDM symbol, and one slot 102 includes $N_{symb}$ OFDM symbols 101, and one subframe 103 includes two slots. A length of the slot is 0.5 ms, and a length of a subframe is 1.0 ms. A radio frame 104 is a time domain unit including 10 subframes. In the frequency domain, a minimum transmission unit is a subcarrier, and a transmission bandwidth of an overall system transmission band includes a total of $N_{SC}^{BW}$ subcarriers 105. In a time-frequency domain, a basic resource unit is a resource element (RE) 106, and the RE 106 is expressed by an OFDM symbol index and a subcarrier index. A resource block (RB) (or physical resource block (PRB)) is defined by consecutive $N_{symb}$ OFDM symbols 101 in the time domain and consecutive $N_{SC}^{RB}$ subcarriers 108 in the frequency domain. So, one PRB 107 includes $N_{symb} \times N_{SC}^{RB}$ REs 106. Generally, a minimum transmission unit for data is an RB. In an LTE communication system, generally, $N_{symb}=7$ and $N_{SC}^{RB}=12$, and $N_{SC}^{BW}$ and $N_{SC}^{RB}$ are proportional to a bandwidth of a system transmission band.

Subsequently, downlink control information (DCI) in LTE and LTE-A communication systems will be described in detail.

In an LTE communication system, scheduling information for downlink data or uplink data is transferred from a base station to a terminal through DCI. The DCI defines various formats. A determined DCI format may be applied based on whether the DCI is scheduling information for uplink data or scheduling information for downlink data, whether the DCI is compact DCI with small-size control information, whether spatial multiplexing using a multi-antenna is applied, whether the DCI is for power control, and/or the like.

For example, DCI format 1, which is scheduling control information for downlink data, may be configured to include at least the following control information.

Resource allocation type 0/1 flag: indicating whether a resource allocation type is type 0 or type 1. Type 0 is a resource allocation type which allocates a resource in a unit of a resource block group (RBG) by applying a bitmap scheme. In an LTE communication system, a basic unit of scheduling is a resource block (RB) expressed by time and frequency domain resources, and an RBG includes a plurality of RBs and is used as a basic unit of scheduling in the type 0 scheme. Type 1 is a resource allocation type which allocates a specific RB within an RBG.

Resource block assignment: indicating an RB allocated to data transmission. A resource to be expressed is determined based on a system bandwidth and a resource allocation scheme.

Modulation and coding scheme (MCS): indicating a modulation scheme used for data transmission and a size of a transport block which is data to be transmitted.

HARQ process number: indicating a process number of HARQ.

New data indicator: indicating whether transmission is HARQ initial transmission or retransmission.

Redundancy version: indicating a redundancy version of HARQ.

Transmit power control (TPC) command for physical uplink control channel (PUCCH): indicating a TPC command for a PUCCH which is an uplink control channel.

The DCI may be transmitted through a physical downlink control channel (PDCCH) or an enhanced PDCCH (E-PDCCH) after a channel coding and modulation process.

A cyclic redundancy check (CRC) is attached to a payload of a DCI message, and the CRC is scrambled by a radio network temporary identifier (RNTI) corresponding to identification of a terminal. Based on a purpose of the DCI message, for example, terminal-specific (UE-specific) data transmission, power control command, random access response, and/or the like, different RNTIs are used. An RNTI may not be transmitted explicitly, but transmitted by being included in a CRC calculation process. When a terminal receives a DCI message transmitted on a PDCCH, the terminal checks a CRC using an allocated RNTI, and may identify that a corresponding message is transmitted to the terminal in a case that the CRC check result is successful.

Figure 2:
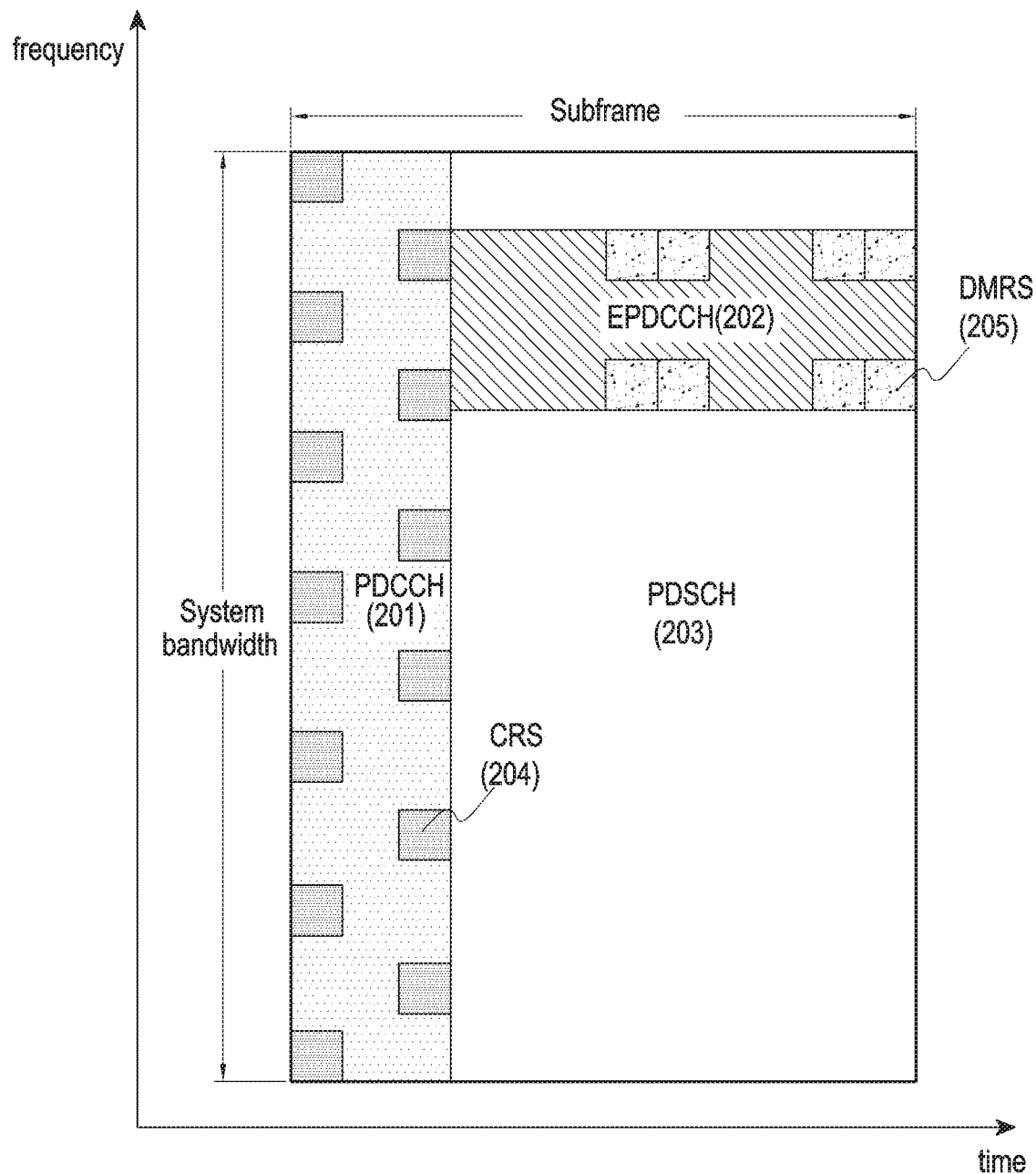
FIG. 2 is a view illustrating a PDCCH and an E-PDCCH as downlink control channels of an LTE communication system.

FIG. 2 is a view illustrating a PDCCH 201 and an enhanced PDCCH (E-PDCCH) 202, which are downlink control channels through which DCI is transmitted, in an LTE communication system.

Referring to FIG. 2, a PDCCH 201 is time-multiplexed with a physical downlink shared channel (PDSCH) 203 which is a data transmission channel, and is transmitted across an entire system bandwidth. A region of the PDCCH 201 is expressed by the number of OFDM symbols, and is indicated to a terminal with a control format indicator (CFI) transmitted through a physical control format indicator channel (PCFICH). By allocating the PDCCH 201 to an OFDM symbol located in the forepart of a subframe, the terminal may immediately decode downlink scheduling allocation, whereby decoding delay for a downlink shared channel (DL-SCH), i.e., overall downlink transmission delay, may be reduced.

One PDCCH carries one DCI message, a plurality of terminals may be simultaneously scheduled in a downlink and an uplink, and thus, a plurality of PDCCHs are simultaneously transmitted in each cell. A CRS 204 is used as a reference signal for decoding the PDCCH 201. The CRS 204 is transmitted in each subframe across an entire band, and scrambling and resource mapping are changed based on a cell identity (ID). The CRS 204 is a reference signal used by all terminals in common, and thus, terminal-specific beamforming may not be used. So, a multi-antenna transmission scheme for a PDCCH of LTE is limited to open-loop transmission diversity. The number of ports of a CRS is implicitly known to a terminal through decoding of a physical broadcast channel (PBCH).

Resource allocation for the PDCCH 201 is based on a control-channel element (CCE), and one CCE includes 9 resource element groups (REGs), i.e., a total of 36 resource elements (REs). The number of CCEs required for the PDCCH 201 may be 1, 2, 4, or 8, which is changed based on a channel coding rate of a DCI message payload. As described above, different values of the number of CCEs are used for implementing a link adaptation of the PDCCH 201. A terminal needs to detect a signal in a state of not knowing of information about the PDCCH 201, and LTE defines a set of CCEs in which a PDCCH may be located for blind decoding. A set of CCEs where a terminal may detect a PDCCH of the terminal will be referred to as a search space, and an individual resource through which the PDCCH may be transmitted within the search space will be referred to as a PDCCH candidate or a PDCCH resource candidate.

A search space includes a plurality of sets based on an aggregation level (AL) of each CCE, and the AL is not explicitly signaled but is defined implicitly through a function by a terminal identify (UE RNTI) and a subframe number. In each subframe, a terminal performs decoding of the PDCCH 201 for all possible resource candidate groups which may be made from CCEs within a configured search space, and processes information which has been indicated to the terminal as valid information through CRC check.

The search space is classified into a terminal-specific search space (UE specific search space: UE-SS) and a common search space (CSS). Terminals in a set group or all terminals may check a common search space for the PDCCH 201 so as to receive cell-specific control information, such as dynamic scheduling for system information or a paging message. For example, scheduling allocation information of a DL-SCH for transmission of a system information block (SIB)-1 including cell operator information, and/or the like may be received by checking a common search space for the PDCCH 201.

According to FIG. 2, an E-PDCCH 202 is frequency-multiplexed with the PDSCH 203, and is transmitted. A base station may appropriately allocate resources of the E-PDCCH 202 and the PDSCH 203 through scheduling, thereby efficiently supporting coexistence with data transmission for a legacy LTE terminal. However, the E-PDCCH 202 is transmitted by being allocated to the entirety of one subframe in a time axis, whereby there is a loss from the perspective of transmission delay time. One E-PDCCH set includes a plurality of E-PDCCHs 202, and allocation of the E-PDCCH set is performed based on a physical resource block (PRB) pair unit. Configuration information including location information for an E-PDCCH set, and/or the like is terminal-specifically (UE-specifically) set, and may be signaled to a terminal through a higher signal such as radio resource control (RRC), or a physical signal. The terminal receives the higher signal or the physical signal, and E-PDCCH sets including PRB pairs are configured to the terminal by the base station. A maximum of two E-PDCCH sets may be configured for each terminal, and one E-PDCCH set may be simultaneously multiplexed and configured for different terminals. Like this, in case that two E-PDCCH sets are configured for a terminal, and PRB pairs included in an E-PDCCH set at least partially overlap in a time/frequency domain, an E-PDCCH blind decoding method of a terminal for reducing power consumption will be described with reference to FIG. 8.

Resource allocation for the E-PDCCH 202 is based on an enhanced CCE (ECCE), and one ECCE may include 4 or 8 enhanced REGs (EREGs), and the number of EREGs per ECCE may vary based on a length of a cyclic prefix (CP) and subframe configuration information. One EREG includes 9 REs, whereby 16 EREGs may be included in each PRB pair. An E-PDCCH transmission scheme is classified into a localized transmission scheme and a distributed transmission scheme based on an RE mapping scheme of an EREG. An aggregation level of the ECCE may be 1, 2, 4, 8, 16, or 32, which may be determined based on the length of the CP, subframe configuration, an E-PDCCH format, and a transmission scheme.

The E-PDCCH 202 supports only a terminal-specific search space. So, a terminal which desires to receive a message including system information needs to search for a common search space on the existing PDCCH 201.

In the E-PDCCH 202, a demodulation reference signal (DMRS) 205 is used as a reference signal for decoding. Pre-coding for the E-PDCCH 202 may be set by a base station, and terminal-specific beamforming may be used. Even though terminals may not know which pre-coding is used, the terminals may perform decoding of the E-PDCCH 202 through the DMRS 205. In the E-PDCCH 202, the same pattern as that of a DMRS of the PDSCH 203 is used. However, unlike the PDSCH 203, the DMRS 205 for the E-PDCCH 202 may support transmission using a maximum of four antenna ports. The DMRS 205 is transmitted in a corresponding PRB in which an E-PDCCH is transmitted.

Port configuration information of the DMRS 205 is changed based on a transmission scheme of the E-PDCCH 202. In a localized transmission scheme, an antenna port corresponding to an ECCE to which the E-PDCCH 202 is mapped is selected based on an identifier (ID) of a terminal. In a case that different terminals share the same ECCE, that is, multiuser MIMO transmission is used, an antenna port of the DMRS 205 may be allocated to each of terminals. Alternatively, the terminals may share and transmit the DMRS 205. In this case, the antenna port of the DMRS 205 may be identified based on a DMRS scrambling sequence set by higher layer signaling. In a distributed transmission scheme, a maximum of two antenna ports of the DMRS 205 are supported, and a diversity scheme of a pre-coder cycling scheme is supported. The DMRS 205 may be shared for all REs transmitted within one PRB pair.

In the foregoing description, a scheme of transmitting a downlink control channel in LTE and LTE-A communication systems and an RS for decoding this have been described.

Hereinafter, a downlink control channel in a 5G communication system will be described with the accompanying drawings.

Figure 3:
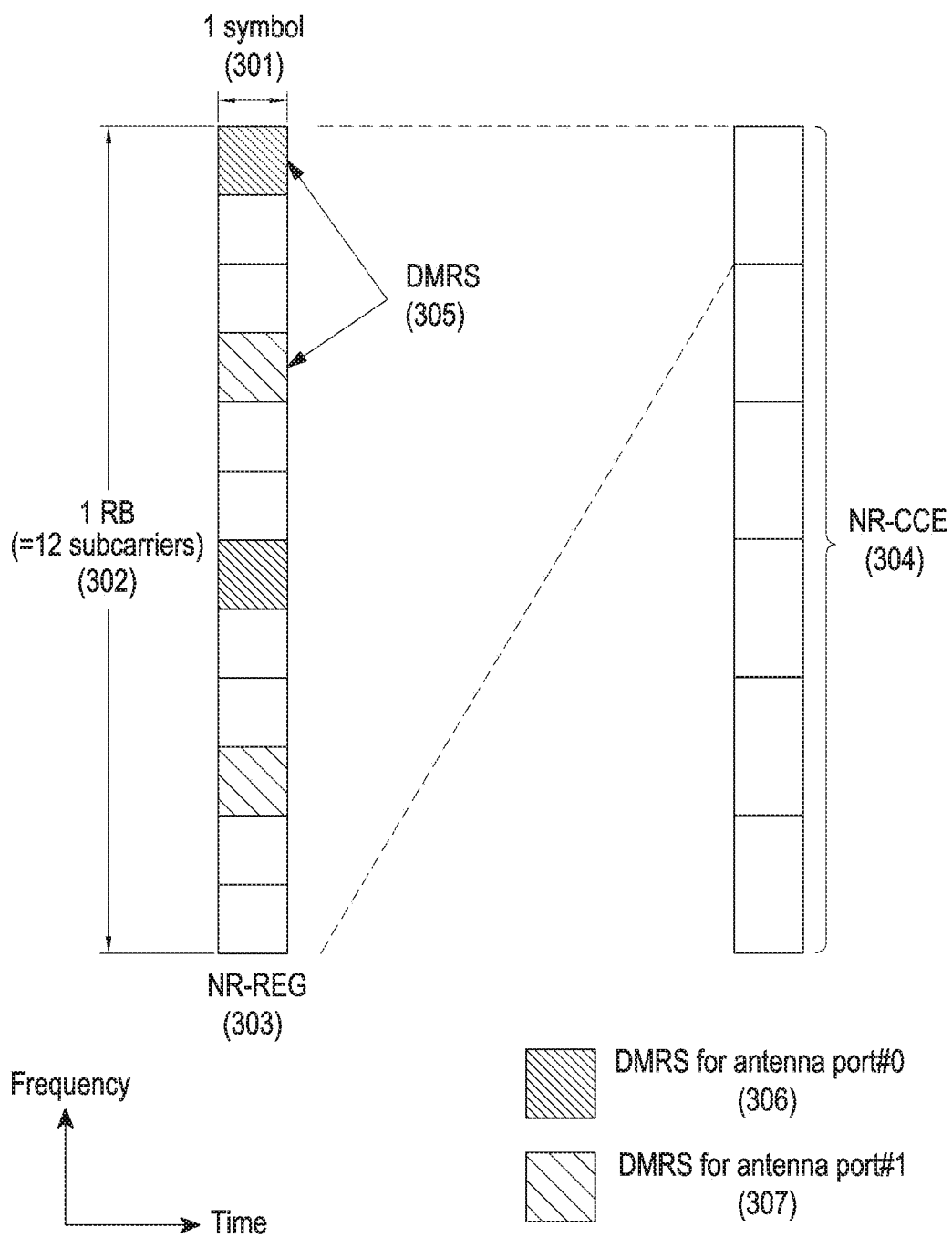
FIG. 3 is a view illustrating a 5G downlink control channel.

FIG. 3 is a view exemplarily illustrating a basic unit of time/frequency resources constituting a downlink control channel which may be used in 5G. The basic unit of time/frequency resources constituting the downlink control channel may be referred to as REG, new radio (NR)-REG, and/or the like. Hereinafter, it will be referred to as NR-REG.

According to FIG. 3, an NR-REG 303 includes one OFDM symbol 301 on a time axis, and twelve sub-carriers 302, i.e., one RB on a frequency axis. In configuring a basic unit of a control channel, a data channel and a control channel may be time-multiplexed within one subframe by assuming that a basic unit on the time axis is one OFDM symbol 301. By placing the control channel ahead of the data channel, processing time for decoding a downlink data channel of a terminal may be reduced, so it is easy to satisfy delay time requirement. By setting a basic unit on the frequency axis to one RB 302, frequency multiplexing between the control channel and the data channel may be more effectively performed.

A downlink control channel region with various sizes may be set by concatenating NR-REGs 303 as shown in FIG. 3. For example, in a case that a basic unit by which a downlink control channel is allocated is an NR-CCE 304 in 5G, one NR-CCE 304 may include a plurality of NR-REGs 303. Taking the NR-CCE 304 as shown in FIG. 3 as an example, in a case that an NR-REG 303 includes 12 REs, and one NR-CCE 304 includes 6 NR-REGs 303, it means that one NR-CCE 304 may include 72 REs (including RE used as a DMRS).

Once a downlink control channel resource (control resource set (CORESET)) is configured, a corresponding resource region may include a plurality of NR-CCEs 304. A specific downlink control channel resource may be mapped to one or more NR-CCEs 304 within the resource region based on an aggregation level (AL) and be transmitted. An AL corresponds to the number of NR-CCEs. For example, in a case that the number of NR-CCEs is 1, it is expressed as AL 1. In a case that the number of NR-CCEs is 4, it is expressed as AL 4.

NR-CCEs 304 within a resource region are identified by a number. At this time, the number is allocated based on a logical mapping scheme. A terminal blind-decodes an NR PDCCH candidate group according to an AL. A value of an AL (the number of NR-CCEs) for blind-decoding may be predetermined based on the first NR-CCE determined by including an RNTI or a slot index of a terminal within a CORESET set by a higher signal or a physical signal, or may be set by a higher signal or a physical signal. The terminal determines the number of PDCCH candidates for each AL which the terminal needs to decode by receiving the higher signal or the physical signal or by predetermination. For example, it may be set such that 4 PDCCH candidates of AL1 including 1 NR-CCE, 2 PDCCH candidates of AL2 including 2 NR-CCEs, and 1 PDCCH candidates of AL4 including 4 NR-CCEs are decoded.

The basic unit of the downlink control channel, i.e., the NR-REG 303, as shown in FIG. 3, may include REs to which downlink control information (DCI) is mapped, and a region to which a DMRS 305 as a reference signal (RS) for demodulating or decoding this is mapped. The DMRS 305 may be effectively transmitted by considering overhead according to RS allocation, and/or the like. For example, in a case that a downlink control channel is transmitted using a plurality of OFDM symbols, the DMRS 305 may be transmitted only in the first OFDM symbol. The DMRS 305 may be mapped to a resource which is set by considering the number of antenna ports used for transmitting the downlink control channel, and transmitted.

FIG. 3 shows an example of a resource to which a DMRS for two antenna ports is mapped. At this time, there may be a DMRS 306 which is transmitted for antenna port #0 and a DMRS 307 which is transmitted for antenna port #1. DMRSs for different antenna ports may be multiplexed with various schemes. An example in FIG. 3 shows an example in which DMRSs corresponding to different antenna ports are orthogonally transmitted through different REs, respectively. Like this, the DMRSs corresponding to the different antenna ports may be transmitted after frequency division multiplexing (FDM), or may be transmitted after code division multiplexing (CDM). In addition, there may be various types of DMRS patterns, which may be related to the number of antenna ports. So, a terminal may identify a DMRS pattern according to each antenna port based on the number of antenna ports determined in a standard or set by a higher signal or a physical signal, and demodulate or decode DCI using an RE where there is a DMRS.

Figure 4:
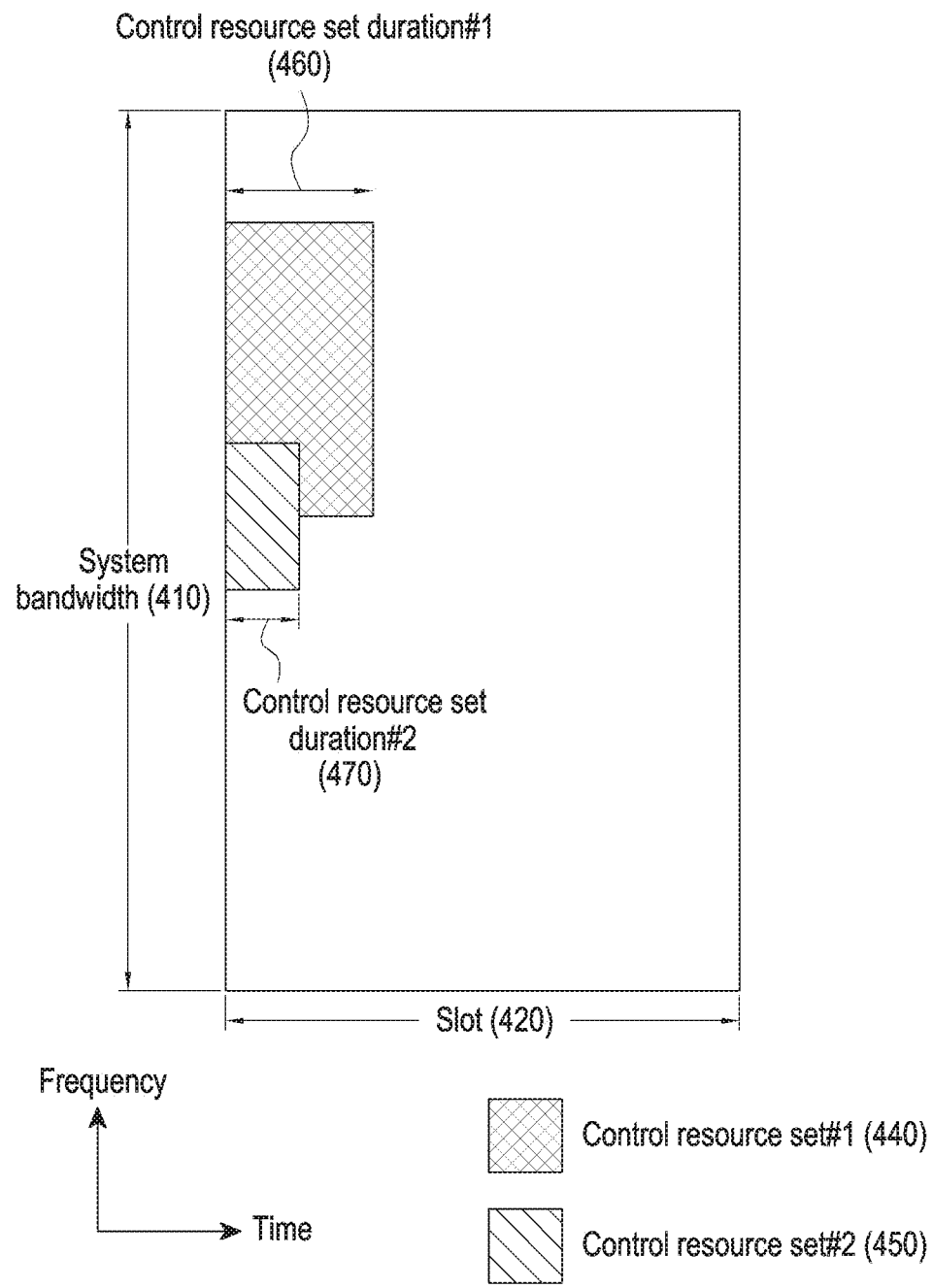
FIG. 4 is a view illustrating a method for allocating a plurality of resource regions for a 5G downlink control channel.

FIG. 4 is a view illustrating an example of a control resource set (CORESET) through which a downlink control channel is transmitted in a 5G communication system. FIG. 4 shows an example in which two CORESETs (CORESET #1 440 and CORESET #2 450) are configured within a system bandwidth 410 on a frequency axis and one slot 420 on a time axis, so resources of CORESETs at least partially overlaps in a time/frequency domain. In the example in FIG. 4, it will be assumed that one slot includes 7 OFDM symbols. A base station may determine the number of OFDM symbols within one symbol from 1 to 14, and transmit it to terminals commonly or to the terminal dedicatedly through a system signal, or a physical signal, or a higher signal, and the terminal may receive the signal.

As illustrated in FIG. 4, search spaces within different multiple CORESETs are independently defined.

CORESETs 440 and 450 may be set with a specific subband within an entire system bandwidth 410 on a frequency axis. The CORESETs 440 and 450 may be set with one or more OFDM symbols on a time axis, and this may be defined as resource area duration. In the example in FIG. 4, the CORESET #1 440 has a resource area duration of two symbols, and the CORESET #2 450 has a resource area duration of one symbol.

In 5G, a plurality of CORESETs may be configured in one system from a base station perspective. Further, a plurality of CORESETs may be configured to one terminal from a terminal perspective. For example, in FIG. 4, two CORESETs including the CORESET #1 460 and the CORESET #2 470 are configured within a system, the CORESET #1 460 may be configured to terminal #1, and the CORESET #1 460 and the CORESET #2 470 may be configured to terminal #2. At this time, the terminal #2 may identify a situation in which the CORESET #1 460 and the CORESET #2 470 overlap in a time/frequency domain, and apply a blind decoding method for a downlink control channel for low power consumption according to an embodiment of the present disclosure.

The CORESET in 5G as described above may be configured cell-commonly, terminal-group commonly (UE-group commonly), or terminal-specifically. A CORESET may be configured to each terminal through a terminal-specific L signaling, a terminal-group common L1 signaling, radio resource control (RRC) signaling, and/or the like, and a terminal receives CORESET configuration through the signaling. The reception of the CORESET configuration in the terminal means that the terminal receives, from a base station, information about a location of the CORESET, a subband, resource allocation of the CORESET, a CORESET length, and/or the like.

Next, CORESET configuration information for a downlink control channel which has been considered in 5G will be described below.

Each terminal may receive CORESET of the downlink control channel through higher layer signaling (e.g., RRC signaling), or a physical layer signaling (e.g., L1 signaling). Further, the CORESET configuration information may include the following information.

TABLE 1

Configuration information 1: RB allocation information on a frequency axis
Configuration information 2: CORESET length on a time axis (the number of OFDM symbols configured as CORESET)
Configuration information 3: Resource mapping scheme (time-first mapping, frequency-first mapping)
Configuration information 4: Transmission mode (localized transmission scheme, distributed transmission scheme)
Configuration information 5: Search space type (a common search space, a terminal-group search space, and a terminal-specific search space)
Configuration information 6: Monitoring occasion (a monitoring period/interval, and a monitoring symbol location within a symbol)
Configuration information 7: DMRS configuration information (a DMRS structure, a DRMS location, and the number of DMRS ports)
Configuration information 8: REG bundling size
Configuration information 9: PDCCH candidate to be blind-decoded (ALs required to be searched, and the number of search candidates per AL)

In addition to the configuration information, various information required for transmitting the downlink control channel may be configured to the terminal.

In the foregoing description, specific examples of a structure and a configuration method for a downlink control channel in a 5G communication system have been described.

In the following, a scheme for reducing power consumption required for decoding a downlink control channel by adjusting the number of PDCCH candidates for which blind-decoding is required in a case that a plurality of CORESETs are configured to one terminal, and at least two CORESETs overlap in a time/frequency region in a 5G communication system will be described with the accompanying drawings.

In a case that two or more overlapped resources are allocated, embodiments of the present disclosure propose a scheme in which a terminal may determine whether to omit decoding for specific PDCCH candidates, and determine which PDCCH candidates as PDCCH candidates for which decoding is omitted in a case of determining to omit the decoding for the specific PDCCH candidates.

Embodiments in FIGS. 5 to 8 describe a scheme of performing blind-decoding with skipping PDCCH candidates of an overlapped region by specifically illustrating various forms of specific PDCCH candidates determined by configuration information for resources of two or more CORESETs in a case that a base station allocates the two or more CORESETs.

An overlapped resource region may be exist in various forms (for example, a case that a PDCCH candidate of CORESET #1 is searched within an overlapped region, a case that an AL which constitutes PDCCH candidates of CORESET #2 is completely included in the overlapped region, a case that the AL which constitutes the PDCCH candidates of the CORESET #2 is not completely included in the overlapped region, and/or the like).

As a criterion for applying a blind-decoding scheme according to embodiments of the present disclosure, a case that resource regions of two or more configured resources overlap is sufficient, and a scope of the present disclosure is not limited to a form of an overlapped resource region.

Figure 9:
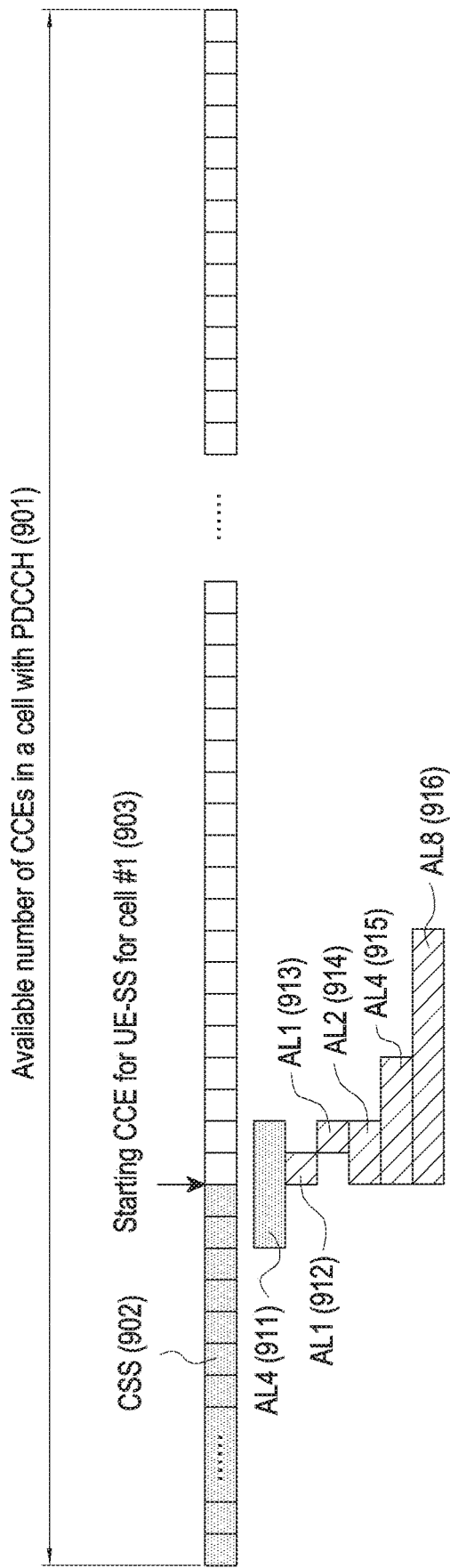
FIG. 9 is a view illustrating the fifth embodiment of the present disclosure.

An embodiment in FIG. 9 illustrates a case that a common search space (CSS) overlaps with a terminal specific search space (UE specific search space (UE-SS)), a resource through which a PDCCH for a specific cell is transmitted) in a carrier aggregation (CA) situation. It is shown that the blind-decoding scheme may be applied to PDCCH resource mapping in a case that PDCCH candidates for the UE-SS overlap with PDCCH candidates for the CSS.

Figure 10:
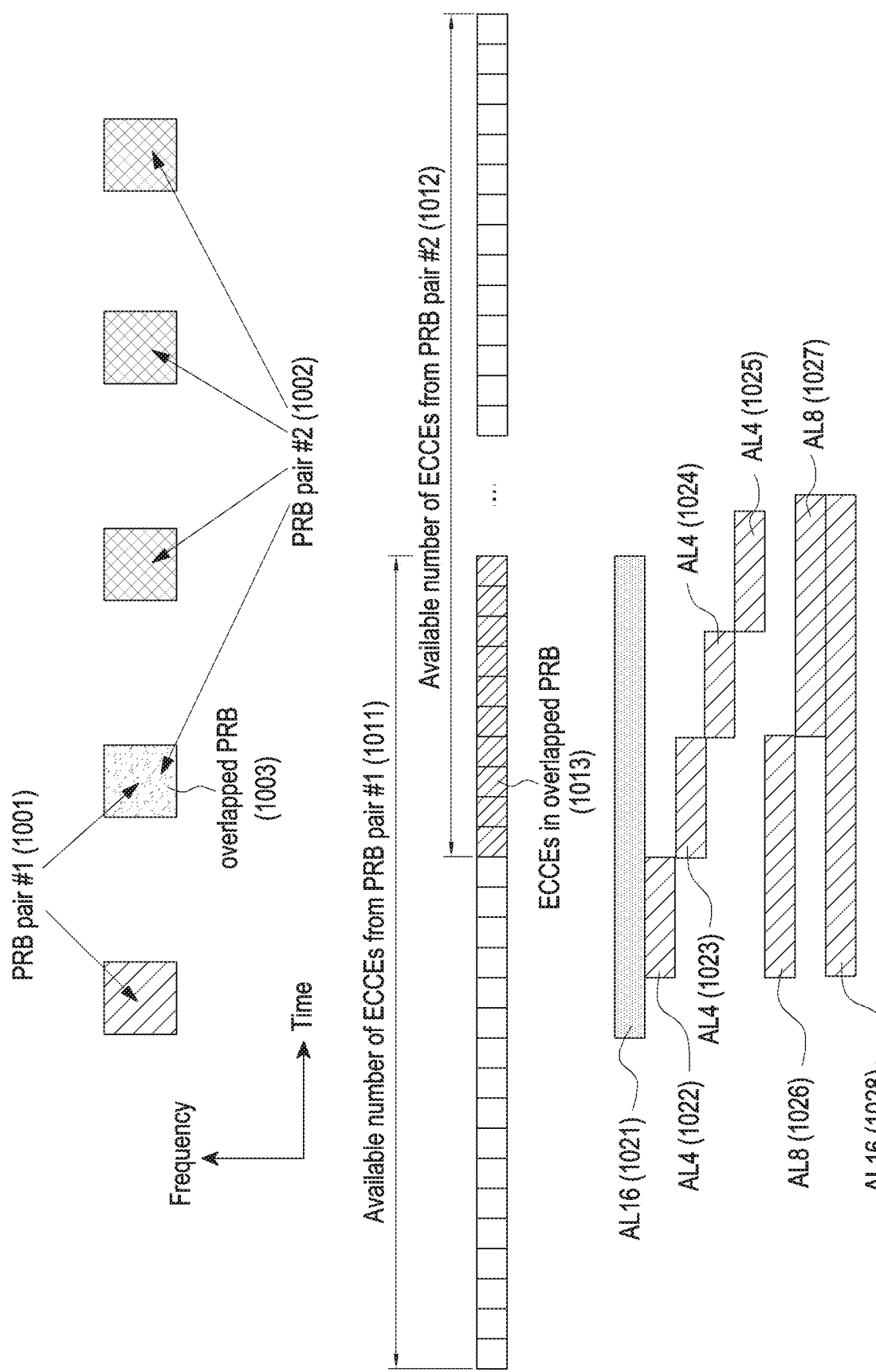
FIG. 10 is a view illustrating the sixth embodiment of the present disclosure.

Meanwhile, in a case of an E-PDCCH, a base station configures, to a terminal, resources called as PRB pair similar to a concept of configuring a CORESET. FIG. 10 exemplarily illustrates how a terminal generates (induces) resources called as ECCE from a configured PRB pair, and skips E-PDCCH candidates which need to be decoded by applying the blind-decoding for E-PDCCH resource mapping in a case that E-PDCCHs overlap within the induced resources.

Hereinafter, embodiments of the present disclosure will be described with reference to FIGS. 5 to 10. At this time, it will be noted that the same components are denoted by the same reference numbers as possible. A detailed description of a well known function and configuration which may unnecessarily obscure a subject matter of the present disclosure will be omitted.

First Embodiment

Figure 5:
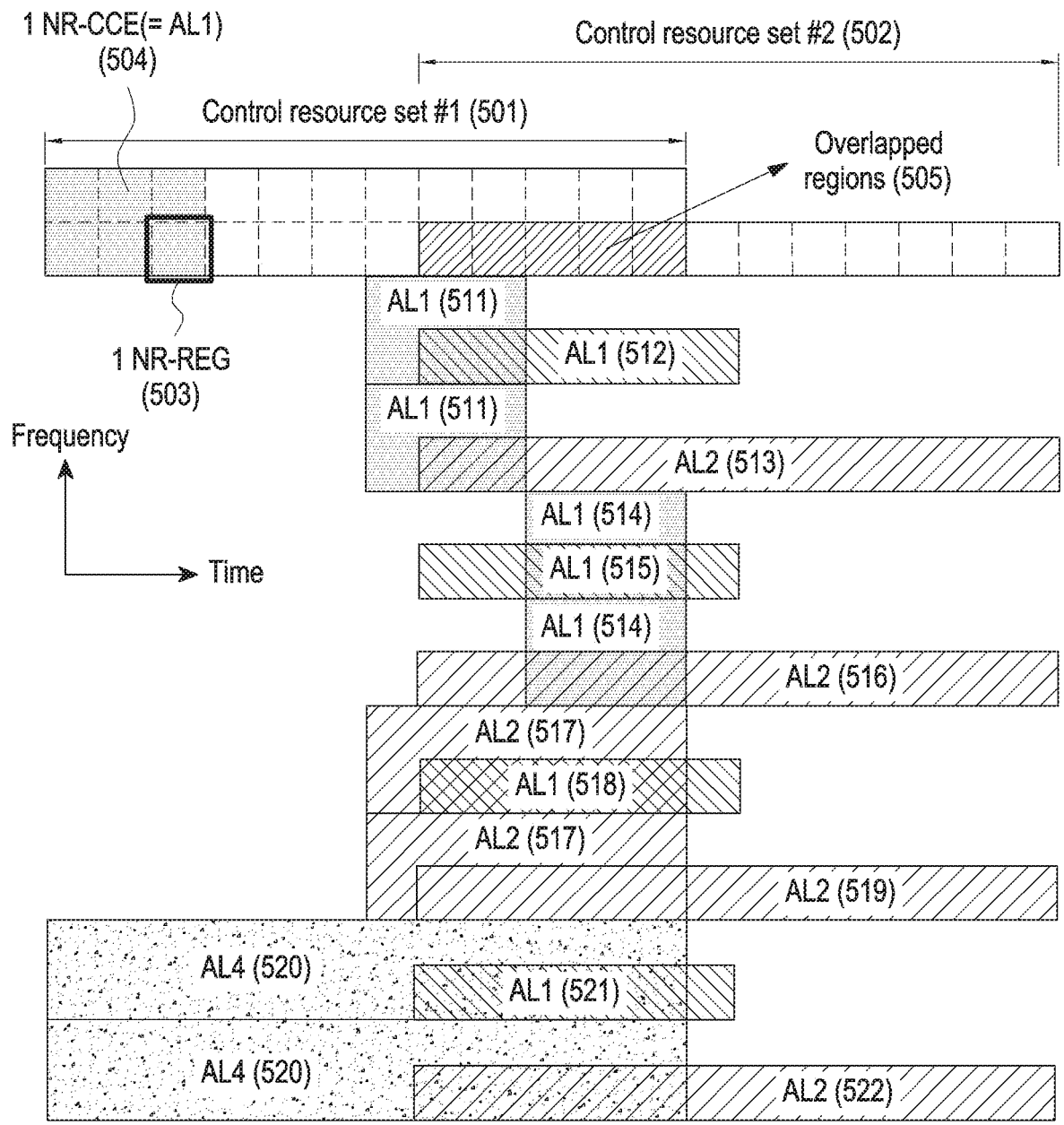
FIG. 5 is a view illustrating the first embodiment of the present disclosure.

FIG. 5 is a view illustrating the first embodiment of the present disclosure. In the first embodiment, it will be assumed that a plurality of CORESETs are configured to one terminal, and at least two CORESETs overlap in a time/frequency domain. In a case that a search for PDCCH is successful in an overlapped region in a process of blind-decoding PDCCH candidates of the first CORESET with the overlapped region, a scheme of re-determining and blind-decoding PDCCH candidates of the second CORESET with the overlapped region is proposed. That is, only remaining PDCCH candidates except for specific PDCCH candidates among PDCCH candidates which are set to be blind-decoded are decoded, thereby power consumption required for decoding a downlink control channel is reduced.

FIG. 5 shows a situation where CORESET #1 501 and CORESET #2 502 are configured to one terminal. The CORESET #1 501 has a resource region length of two symbols in a time domain, and includes 12 RBs in a frequency domain. The CORESET #2 502 has a resource region length of one symbol, and includes 12 RBs in the frequency domain. Further, a scheme of mapping an NR-REG 503 to an NR-CCE 504 is a time-first scheme, so FIG. 5 shows a case that a PDCCH candidate 504 of AL1 is configured when one NR-CCE includes 6 NR-REGs.

There is a region 505 where the CORESET #1 501 and the CORESET #2 502 overlap in the time/frequency domain, and the overlapped region 505 has a size of 5 NR-REGs, so a terminal may identify that one PDCCH candidate which belongs to the CORESET #1 501 and the CORESET #2 502 may not be formed with only the overlapped region 505.

If the terminal succeeds in decoding a PDCCH 511 of AL1 while blind-decoding PDCCH candidates of the CORESET #1 501, the terminal may identify that other PDCCHs may not be transmitted through a resource of the PDCCH 511 of AL1. So, there is no need to blind-decode a PDCCH candidate 512 of AL1 and a PDCCH candidate 513 of AL2 of the CORESET #2 502 of which resources overlap with the PDCCH 511 of AL1 of the CORESET #1 501 within the overlapped region 505. So, the terminal excludes the PDCCH candidate 512 of AL1 and the PDCCH candidate 513 of AL2 of the CORESET #2 502 from PDCCH candidates for blind-decoding of the CORESET #2 502, and blind-decodes only remaining PDCCH candidates of the CORESET #2 502.

If the terminal succeeds in decoding a PDCCH 514 of AL1 while blind-decoding the PDCCH candidates of the CORESET #1 501, the terminal may identify that other PDCCHs may not be transmitted through a resource of the PDCCH 514 of AL1. So, there is no need for blind-decoding a PDCCH candidate 515 of AL1 and a PDCCH candidate 516 of AL2 of the CORESET #2 502 of which resources overlap with the PDCCH 514 of AL1 of the CORESET #1 501 within the overlapped region 505. So, the terminal excludes the PDCCH candidate 515 of AL1 and the PDCCH candidate 516 of AL2 of the CORESET #2 502 from PDCCH candidates for blind-decoding of the CORESET #2 502, and blind-decodes only remaining PDCCH candidates of the CORESET #2 502.

If the terminal succeeds in decoding a PDCCH 517 of AL2 while blind-decoding the PDCCH candidates of the CORESET #1 501, the terminal may identify that other PDCCHs may not be transmitted through a resource of the PDCCH 517 of AL2. So, there is no need for blind-decoding a PDCCH candidate 518 of AL1 and a PDCCH candidate 519 of AL2 of the CORESET #2 502 of which resources overlap with the PDCCH 517 of AL2 of the CORESET #1 501 within the overlapped region 505. So, the terminal excludes the PDCCH candidate 518 of AL1 and the PDCCH candidate 519 of AL2 of the CORESET #2 502 from the PDCCH candidates for blind-decoding of the CORESET #2 502, and blind-decodes only remaining PDCCH candidates of the CORESET #2 502.

If the terminal succeeds in decoding a PDCCH 520 of AL4 while blind-decoding the PDCCH candidates of the CORESET #1 501, the terminal may identify that other PDCCHs may not be transmitted through a resource of the PDCCH 520 of AL4. So, there is no need for blind-decoding a PDCCH candidate 521 of AL1 and a PDCCH candidate 522 of AL2 of the CORESET #2 502 of which resources overlap with the PDCCH 520 of AL4 of the CORESET #1 501 within the overlapped region 505. So, the terminal excludes the PDCCH candidate 521 of AL1 and the PDCCH candidate 522 of AL2 of the CORESET #2 502 from the PDCCH candidates for blind-decoding of the CORESET #2 502, and blind-decodes only remaining PDCCH candidates of the CORESET #2 502.

Although the embodiment has been described assuming specific ALs, an applicable range of the embodiment is not limited to the specific ALs, and the embodiment may be applied to all ALs included in CORESET configuration.

Although the embodiment has been described assuming a terminal decodes all PDCCH candidates included in a CORESET, the embodiment may be applied to a case that PDCCH candidates are blind-decoded from an NR-CCE with a specific index based on an RNTI of the terminal or a slot index.

Second Embodiment

Figure 6:
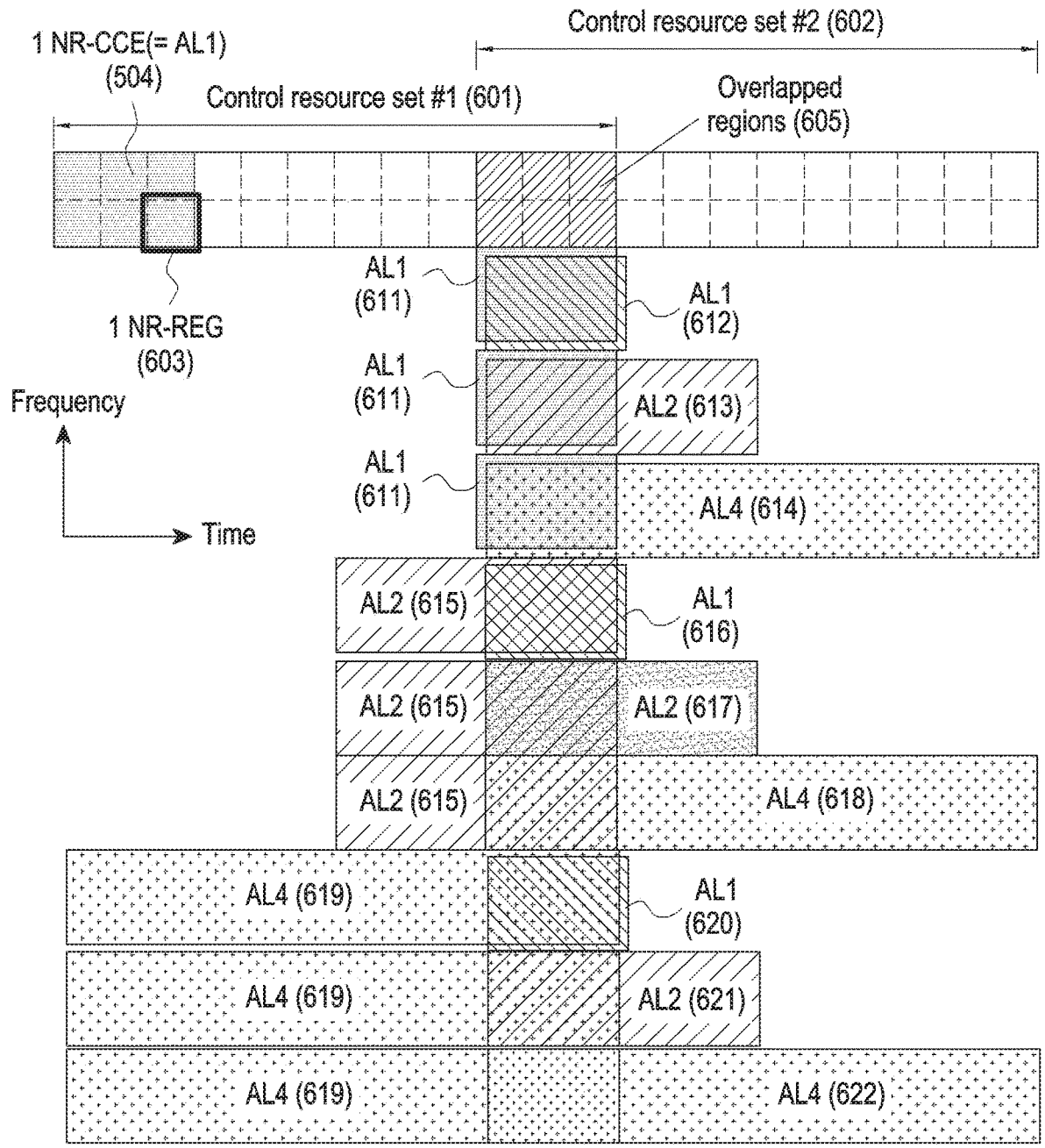
FIG. 6 is a view illustrating the second embodiment of the present disclosure.

FIG. 6 is a view illustrating the second embodiment of the present disclosure. In the second embodiment, it will be assumed that a plurality of CORESETs are configured to one terminal, and at least two CORESETs overlap in a time/frequency domain. In a case that a search for PDCCH is successful in an overlapped region in a process of blind-decoding PDCCH candidates of the first CORESET with the overlapped region, a scheme of re-determining PDCCH candidates of the second CORESET with the overlapped region, and blind-decoding PDCCH candidates of the second CORESET is proposed. That is, only remaining PDCCH candidates except for specific PDCCH candidates among PDCCH candidates which are set to be blind-decoded are decoded, thereby power consumption required for decoding a downlink control channel is reduced.

FIG. 6 shows a situation that CORESET #1 601 and CORESET #2 602 are configured to one terminal. The CORESET #1 601 has a resource region length of two symbols in a time domain, and includes 12 RBs in a frequency domain. The CORESET #2 602 has a resource region length of two symbols, and includes 12 RBs in a frequency domain. Further, a scheme of mapping an NR-REG 603 to an NR-CCE 604 is a time-first scheme, so FIG. 6 shows a case that a PDCCH candidate 604 of AL1 is configured when one NR-CCE includes 6 NR-REGs.

There is a region 605 where the CORESET #1 601 and the CORESET #2 602 overlap in a time/frequency domain, and the overlapped region 605 has a size of 6 NR-REGs, so a terminal may identify that one PDCCH candidate which belongs to the CORESET #1 601 and the CORESET #2 602 may be formed with only the overlapped region 605.

If the terminal succeeds in decoding a PDCCH 611 of AL1 while blind-decoding PDCCH candidates of the CORESET #1 601, the terminal may identify that other PDCCHs may not be transmitted through a resource of the PDCCH 611 of AL1. So, there is no need to blind-decode a PDCCH candidate 612 of AL1, a PDCCH candidate 613 of AL2, and a PDCCH candidate 614 of AL4 of the CORESET #2 602 of which resources overlap with the PDCCH 611 of AL1 of the CORESET #1 within the overlapped region 605. So, the terminal excludes the PDCCH candidate 612 of AL1, the PDCCH candidate 613 of AL2, and the PDCCH candidate 614 of AL4 of the CORESET #2 602 from PDCCH candidates for blind-decoding of the CORESET #2 602, and blind-decodes only remaining PDCCH candidates of the CORESET #2 602.

If the terminal succeeds in decoding a PDCCH 615 of AL2 while blind-decoding PDCCH candidates of the CORESET #1 601, the terminal may identify that other PDCCHs may not be transmitted through a resource of the PDCCH 615 of AL2. So, there is no need for blind-decoding a PDCCH candidate 616 of AL1, a PDCCH candidate 617 of AL2, and a PDCCH candidate 618 of AL4 of the CORESET #2 602 of which resources overlap with the PDCCH 615 of AL2 of the CORESET #1 601 within the overlapped region 605. So, the terminal excludes the PDCCH candidate 616 of AL1, the PDCCH candidate 617 of AL2, and the PDCCH candidate 618 of AL4 of the CORESET #2 602 from the PDCCH candidates for blind-decoding of the CORESET #2 602, and blind-decodes only remaining PDCCH candidates of the CORESET #2 602.

If the terminal succeeds in decoding a PDCCH 619 of AL4 while blind-decoding PDCCH candidates of the CORESET #1 601, the terminal may identify that other PDCCHs may not be transmitted through a resource of the PDCCH 619 of AL4. So, there is no need for blind-decoding a PDCCH candidate 620 of AL1, a PDCCH candidate 621 of AL2, and a PDCCH candidate 622 of AL4 of which resources overlap with the PDCCH 619 of AL4 of the CORESET #1 601 within the overlapped region 605. So, the terminal excludes the PDCCH candidate 620 of AL1, the PDCCH candidate 621 of AL2, and the PDCCH candidate 622 of AL4 from the PDCCH candidates for blind-decoding of the CORESET #2 602, and blind-decodes only remaining PDCCH candidates of the CORESET #2 602.

Although the embodiment has been described assuming specific ALs, the embodiment is not limited to the specific ALs, and the embodiment may be applied to all ALs included in CORESET configuration.

Although the embodiment has been described assuming a terminal decodes all PDCCH candidates included in a CORESET, the embodiment may be applied to a case that PDCCH candidates are blind-decoded from an NR-CCE with a specific index based on an RNTI of the terminal or a slot index.

Third Embodiment

Figure 7:
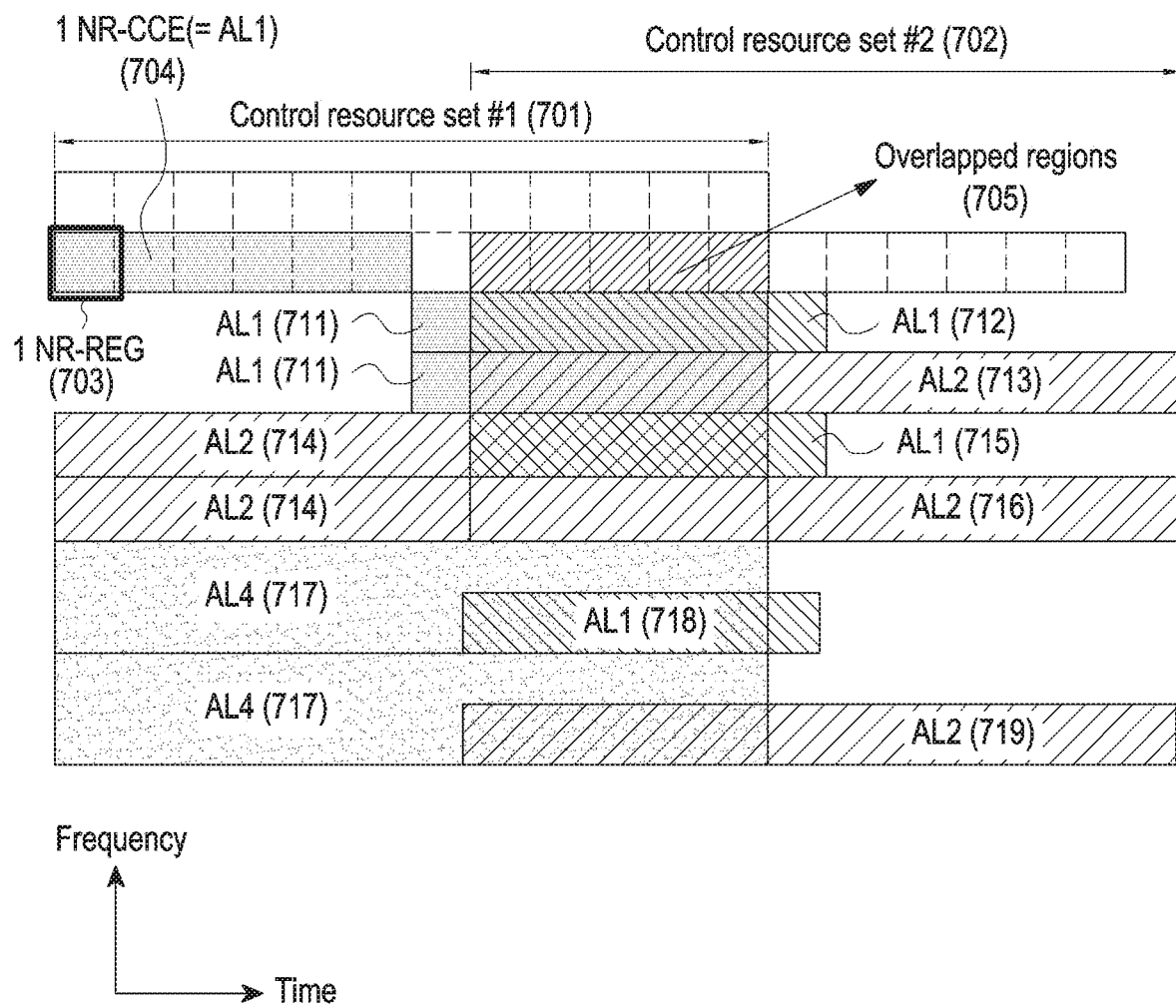
FIG. 7 is a view illustrating the third embodiment of the present disclosure.

FIG. 7 is a view illustrating the third embodiment of the present disclosure. It will be assumed that a plurality of CORESETs are configured to one terminal, and at least two CORESETs overlap in a time/frequency domain. In a case that a search for PDCCH is successful in an overlapped region in a process of blind-decoding PDCCH candidates of the first CORESET with the overlapped region, a scheme of re-determining PDCCH candidates of the second CORESET with the overlapped region, and blind-decoding the PDCCH candidates of the second CORESET is proposed. That is, only remaining PDCCH candidates except for specific PDCCH candidates which are set to be blind-decoded are decoded, thereby power consumption required for decoding a downlink control channel is reduced.

FIG. 7 shows a situation that CORESET #1 701 and CORESET #2 702 are configured to one terminal. The CORESET #1 701 has a resource region length of two symbols in a time domain, and includes 12 RBs in a frequency domain. The CORESET #2 702 has a resource region length of 1 symbol, and includes 12 RBs in a frequency domain. Further, a scheme of mapping an NR-REG 703 to an NR-CCE 704 is a frequency-first scheme, so FIG. 7 shows a case that a PDCCH candidate 704 of AL1 is configured when one NR-CCE includes 6 NR-REGs.

There is a region 705 where the CORESET #1 701 and the CORESET #2 702 overlap in a time/frequency domain, and the overlapped region 705 has a size of 5 NR-REGs, so a terminal may identify that one PDCCH candidate which belongs to the CORESET #1 701 and the CORESET #2 702 may not be formed with only the overlapped region 705.

If the terminal succeeds in decoding a PDCCH 711 of AL1 while blind-decoding PDCCH candidates of the CORESET #1 701, the terminal may identify that other PDCCHs may not be transmitted through a resource of the PDCCH 711 of AL1. So, there is no need for blind-decoding a PDCCH candidate 712 of AL1, and a PDCCH candidate 713 of AL2 of the CORESET #2 702 of which resources overlap with the PDCCH 711 of AL1 of the CORESET #1 701 within the overlapped region 705. So, the terminal excludes the PDCCH candidate 712 of AL1, and the PDCCH candidate 713 of AL2 of the CORESET #2 702 from PDCCH candidates for blind-decoding of the CORESET #2 702, and blind-decodes only remaining PDCCH candidates of the CORESET #2 702.

If the terminal succeeds in decoding a PDCCH 714 of AL2 while blind-decoding the PDCCH candidates of the CORESET #1 701, the terminal may identify that other PDCCHs may not be transmitted through a resource of the PDCCH 714 of AL2. So, there is no need for blind-decoding the PDCCH candidate 715 of AL1, and the PDCCH candidate 716 of AL2 within the CORESET #2 702 of which resources overlap with the PDCCH 714 of AL2 of the CORESET #1 701 within the overlapped region 705. So, the terminal excludes the PDCCH candidate 715 of AL1, and the PDCCH candidate 716 of AL2 of the CORESET #2 702 from the PDCCH candidates for blind-decoding of the CORESET #2 702, and blind-decodes only remaining PDCCH candidates of the CORESET #2 702.

If the terminal succeeds in decoding a PDCCH 717 of AL4 while blind-decoding PDCCH candidates of the CORESET #1 701, the terminal may identify that other PDCCHs may not be transmitted through a resource of the PDCCH 717 of AL4. So, there is no need for blind-decoding a PDCCH candidate 718 of AL1 and a PDCCH candidate 719 of AL2 of which resources overlap with the PDCCH 717 of AL4 of the CORESET #1 701 within the overlapped region 705. So, the terminal excludes the PDCCH candidate 718 of AL1 and the PDCCH candidate 719 of AL2 from the PDCCH candidates for blind-decoding of the CORESET #2 702, and blind-decodes only remaining PDCCH candidates of the CORESET #2 702.

Although the embodiment has been described assuming specific ALs, the embodiment is not limited to the specific ALs, and the embodiment may be applied to all ALs included in CORESET configuration.

Although the embodiment has been described assuming a terminal decodes all PDCCH candidates included in a CORESET, the embodiment may be applied to a case that PDCCH candidates are blind-decoded from an NR-CCE with a specific index based on an RNTI of the terminal or a slot index.

Fourth Embodiment

Figure 8:
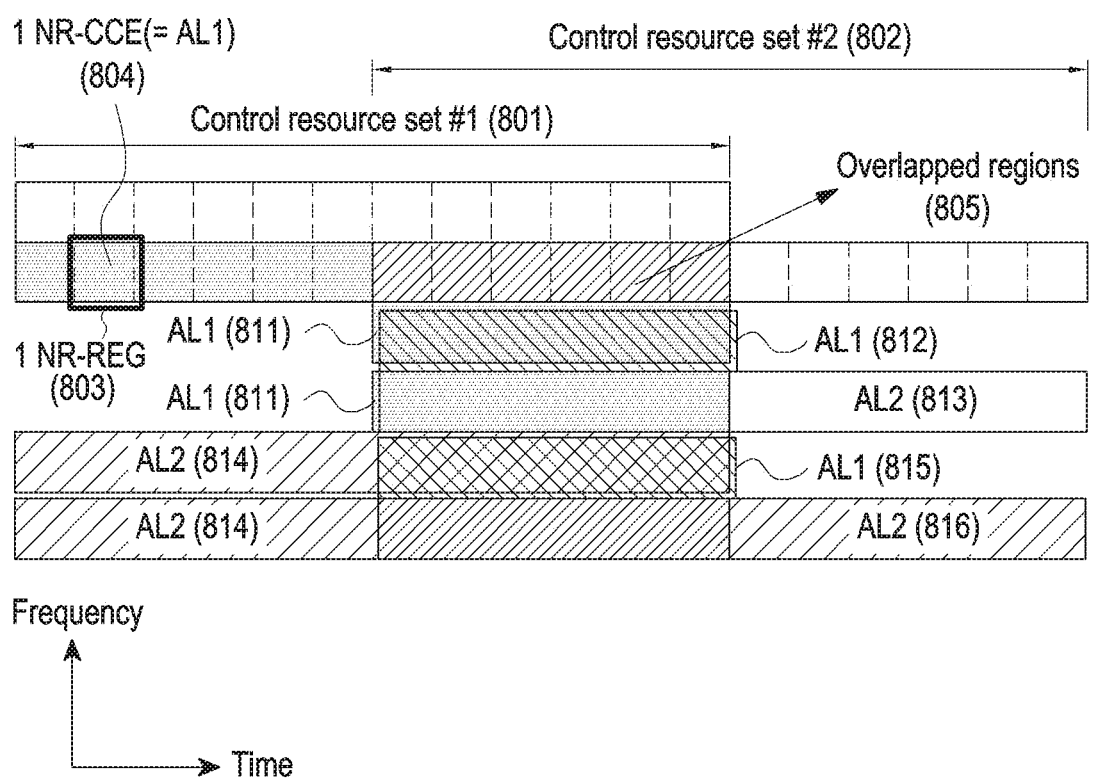
FIG. 8 is a view illustrating the fourth embodiment of the present disclosure.

FIG. 8 is a view illustrating the fourth embodiment of the present disclosure. It is assumed that a plurality of CORESETs are configured to one terminal, and at least two CORESETs overlap in a time/frequency domain. In a case that a search for PDCCH is successful in an overlapped region in a process of blind-decoding PDCCH candidates of the first CORESET with the overlapped region, a scheme of re-determining PDCCH candidates of the second CORESET with the overlapped region, and blind-decoding the PDCCH candidates of the second CORESET is proposed. That is, only remaining PDCCH candidates except for specific PDCCH candidates among PDCCH candidates which are set to be blind-decoded are decoded, thereby power consumption required for decoding a downlink control channel is reduced.

FIG. 8 shows a situation that CORESET #1 801 and CORESET #2 802 are configured to one terminal. The CORESET #1 801 has a resource region length of two symbols in a time domain, and includes 12 RBs in a frequency domain. The CORESET #2 802 has a resource region length of 1 symbol, and includes 12 RBs in a frequency domain. Further, a scheme of mapping an NR-REG 803 to an NR-CCE 804 is a frequency-first scheme, so FIG. 8 shows a case that a PDCCH candidate 804 of AL1 is configured when 1 NR-CCE includes 6 NR-REGs.

There is a region 805 where the CORESET #1 801 and the CORESET #2 802 overlap in a time/frequency domain. The overlapped region 805 has a size of 6 NR-REGs, so a terminal may identify that 1 PDCCH candidate which belongs to the CORESET #1 801 and the CORESET #2 802 may be formed with only the overlapped region 805.

If the terminal succeeds in decoding a PDCCH 811 of AL1 while blind-decoding PDCCH candidates of the CORESET #1 801, the terminal may identify that other PDCCHs may not be transmitted through a resource of the PDCCH 811 of AL1. So, there is no need for blind-decoding a PDCCH candidate 812 of AL1, and a PDCCH candidate 813 of AL2 of the CORESET #2 802 of which resources overlap with the PDCCH 811 of AL1 of the CORESET #1 801 within the overlapped region 805. So, the terminal excludes the PDCCH candidate 812 of AL1, and the PDCCH candidate 813 of AL2 of the CORESET #2 802 from PDCCH candidates for blind-decoding of the CORESET #2 802, and blind-decodes only remaining PDCCH candidates of the CORESET #2 802.

If the terminal succeeds in decoding a PDCCH 814 of AL2 while blind-decoding PDCCH candidates of the CORESET #1 801, the terminal may identify that other PDCCHs may not be transmitted through a resource of the PDCCH 814 of AL2. So, there is no need for blind-decoding a PDCCH candidate 815 of AL1, and a PDCCH candidate 816 of AL2 of the CORESET #2 802 of which resources overlap with the PDCCH 814 of AL2 of the CORESET #1 801 within the overlapped region 805. So, the terminal excludes the PDCCH candidate 815 of AL1, and the PDCCH candidate 816 of AL2 of the CORESET #2 802 from the PDCCH candidates for blind-decoding of the CORESET #2 802, and blind-decodes only remaining PDCCH candidates of the CORESET #2 802.

Although the embodiment has been described assuming specific ALs, the embodiment is not limited to the specific ALs, and the embodiment may be applied to all ALs included in CORESET configuration.

Although the embodiment has been described assuming a terminal decodes all PDCCH candidates included in a CORESET, the embodiment may be applied to a case that PDCCH candidates are blind-decoded from an NR-CCE with a specific index based on an RNTI of the terminal or a slot index.

Fifth Embodiment

FIG. 9 is a view illustrating the fifth embodiment of the present disclosure. It is assumed that a common search space (CSS) and a UE specific search space (UE-SS) overlap in a logical region of control-channel elements (CCEs), for one terminal to which carrier aggregation (CA) is set in an LTE PDCCH. In a case that a search for PDCCH is successful in an overlapped region in a process of blind-decoding PDCCH candidates of a CSS with the overlapped region, a scheme of re-determining PDCCH candidates of a UE-SS with the overlapped region, and blind-decoding the PDCCH candidates of the UE-SS is proposed. That is, remaining PDCCH candidates except for specific PDCCH candidates among PDCCH candidates which are set to be blind-decoded are decoded, thereby power consumption required for decoding a downlink control channel is reduced.

FIG. 9 shows a situation in which a CSS 902 overlaps with a start point 903 of a CCE for blind-decoding a UE-SS for PDCCH transmission of cell #1 in a case that the number of CCEs as a PDCCH resource in a cell which is transmitted to one terminal is as shown in FIG. 9. In FIG. 9, one grid denotes one CCE. If a terminal succeeds in decoding a PDCCH 911 of AL4 while blind-decoding a CSS, the terminal may identify that other PDCCHs may not be transmitted through a resource of the PDCCH 911 of AL4. So, there is no need for blind-decoding candidates of AL which start at a start point of a UE-SS which overlaps with the resource of the PDCCH 911 of AL4 of the CSS 902, i.e., a PDCCH candidate 912 of AL1, a PDCCH candidate 914 of AL2, a PDCCH candidate 915 of AL4, and a PDCCH candidate 916 of AL8, as shown in FIG. 9. So, the terminal excludes the candidates of AL which start at the start point of the UE-SS, i.e., the PDCCH candidate 912 of AL1, the PDCCH candidate 914 of AL2, the PDCCH candidate 915 of AL4, and the PDCCH candidate 916 of AL8 from PDCCH candidates for blind-decoding of a UE-SS for cell #1, and blind-decodes only remaining PDCCH candidates of the UE-SS for the cell #1.

Although the embodiment has been described assuming specific ALs, the embodiment is not limited to the specific ALs, and the embodiment may be applied to all ALs included in CORESET configuration.

Sixth Embodiment

FIG. 10 is a view illustrating the sixth embodiment of the present disclosure. It is assumed that there are PRBs which overlap within a PRB pair configured to one terminal to which the plurality of PRB pairs are configured in an LTE E-PDCCH. In a case that a search for PDCCH is successful in an overlapped region in a process of blind-decoding PDCCH candidates, a scheme of re-determining PDCCH candidates of a PRB pair with the overlapped region, and blind-decoding the PDCCH candidates of the PRB pair is proposed. That is, remaining PDCCH candidates except for specific PDCCH candidates among PDCCH candidates which are set to be blind-decoded are decoded, thereby power consumption required for decoding a downlink control channel is reduced.

FIG. 10 shows a situation in which there is an overlapped PRB 1003 in a case that PRB pair #1 1001 and PRB pair #1 1002 for configuring an E-PDCCH resource to one terminal is as shown in FIG. 10. In FIG. 10, one grid denotes one ECCE. ECCEs generated from each PRB pair are shown by reference numerals 1011 and 1012, respectively, and an ECCE generated from an overlapped PRB is shown by a reference numeral 1013. If a terminal succeeds in decoding a PDCCH 1021 of AL16 while blind-decoding an ECCE generated from PRB pair #1 1011, the terminal may identify that other E-PDCCHs may not be transmitted through a resource of the PDCCH 1021 of AL16. So, there is no need for blind-decoding candidates of AL which exist within ECCEs 1013 generated from an overlapped PRB, i.e., a PDCCH candidate 1022, a PDCCH candidate 1023, a PDCCH candidate 1024, and a PDCCH candidate 1025 of AL4, a PDCCH candidate 1026 and a PDCCH candidate 1027 of AL 8, and a PDCCH candidate 1028 of AL 16, as shown in FIG. 9 among ECCEs 1012 generated from PRB pair #2 of which a resource overlaps with a PDCCH 1021 of AL 16 of ECCEs 1011 generated from PRB pair #1. So, the terminal excludes the candidates of AL within the ECCEs 1013 generated from the overlapped PRB, i.e., the PDCCH candidate 1022, the PDCCH candidate 1023, the PDCCH candidate 1024, and the PDCCH candidate 1025 of AL4, the PDCCH candidate 1026 and the PDCCH candidate 1027 of AL 8, and the PDCCH candidate 1028 of AL 16 among the ECCEs 1012 generated from the PRB pair #2 from PDCCH candidates for blind-decoding of the PRB pair #2 1012, and blind-decodes only remaining PDCCH candidates of the PRB pair #2 1012.

Although the embodiment has been described assuming specific ALs, the embodiment is not limited to the specific ALs, and the embodiment may be applied to all ALs included in CORESET configuration.

Figure 11:
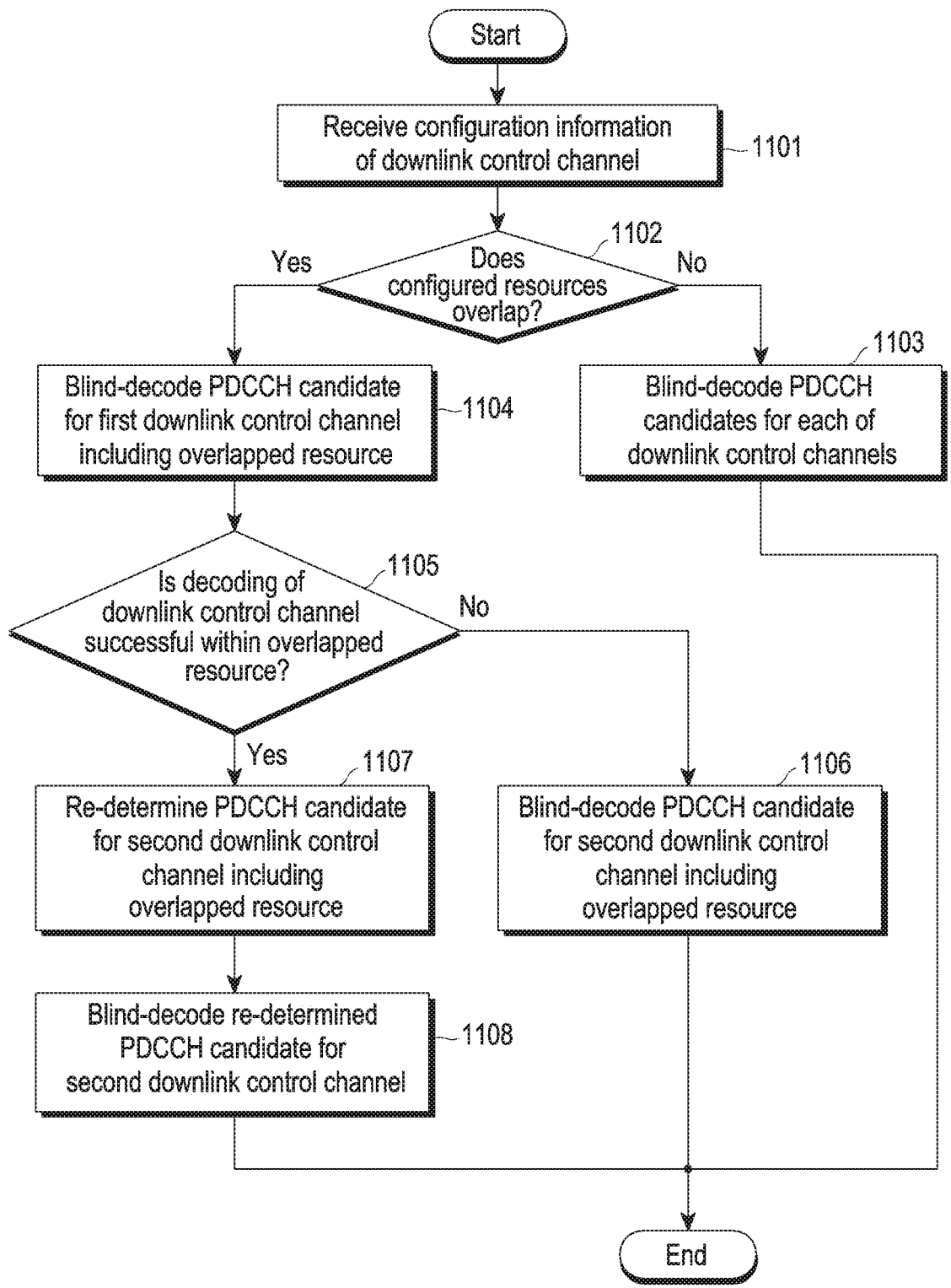
FIG. 11 is a view illustrating a terminal operation according to embodiments of the present disclosure.

FIG. 11 is a view illustrating a terminal operation according to embodiments of the present disclosure.

At operation 1101, a terminal receives configuration information of a downlink control channel required for decoding the downlink control channel.

Upon transmitting the configuration information of the downlink control channel, a base station may configure a time/frequency resource which the terminal may decode with a form of CORESET, and inform the terminal of the configuration information through a higher layer signaling such as an RRC signaling or a physical layer signaling. A plurality of configured resources may be included in the configuration information of the downlink control channel. At this time, the downlink control channel may be a PDCCH or an E-PDCCH as an enhanced channel of the PDCCH. Hereinafter, for convenience, it will be assumed that the downlink control channel is the PDCCH.

Each configuration information includes information about PDCCH candidates which a terminal needs to decode according to a standard. Once a start point of a configured resource is determined based on configuration information, the terminal performs blind-decoding which the terminal needs to perform automatically (as specified in the standard). For example, the terminal applies a routine for decoding a PDCCH candidate of AL1 of CORESET #1 which is one configured resource, decoding a PDCCH candidate of AL2 of the CORESET #1, and decoding a PDCCH candidate of AL4 of the CORESET #1. Further, the terminal routinely performs blind decoding on PDCCH candidates in the same manner within CORESET #2 which is another configured resource.

As described above, two or more CORESETs allocated to one terminal may overlap in a time/frequency domain. At operation 1102, the terminal identifies whether a plurality of resources included in the configuration information of the downlink control channel overlap in a time domain and a frequency domain. For example, in a case that the terminal has searched for (estimated) a specific PDCCH candidate by blind-decoding PDCCH candidates of the CORESET #1, a resource of the searched PDCCH candidate is a resource which has been used already, so other PDCCH candidates may not use the resource of the searched PDCCH candidate. That is, it will be understood that there is no need for blind-decoding other PDCCH candidates with a resource region which overlaps with a resource of a PDCCH candidate which has been searched already.

By considering this, in an embodiment of the present disclosure, in a process of blind-decoding PDCCH candidates of CORESET #1 after searching for a specific PDCCH candidate by blind-decoding the PDCCH candidates of the CORESET #1, the terminal excludes a PDCCH candidate(s) with a resource region which overlaps a resource of the searched PDCCH candidate from decoding targets, and blind-decodes only remaining PDCCH candidates.

If the terminal identifies that the resources do not overlap in the time domain and the frequency domain at operation 1102, the terminal blind-decodes PDCCH candidates of each of downlink control channel resources at operation 1103. If the terminal identifies that the resources overlap in the time domain and the frequency domain at operation 1102, the terminal blind-decodes a PDCCH candidate for the first downlink control channel including an overlapped resource at operation 1104.

At operation 1105, the terminal identifies whether PDCCH decoding is successful within a resource which overlaps with a resource of the second downlink control channel in the time/frequency domain among resources of the first downlink control channel at operation 1105. If the PDCCH decoding within the overlapped resource is not successful at operation 1105, the terminal blind-decodes a PDCCH candidate for a resource of the second downlink control channel including the overlapped resource at operation 1106. If the PDCCH decoding within the overlapped resource is successful at operation 1105, the terminal re-determines PDCCH candidates which are required to be blind-decoded in the resource of the second downlink control channel including the overlapped resource at operation 1107. A method of re-determining PDCCH candidates follows a method as described in embodiments of the present disclosure.

The terminal blind-decodes the re-determined PDCCH candidates for the second downlink control channel at operation.

Figure 12:
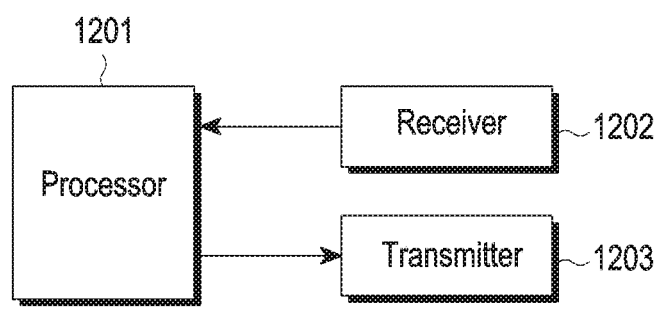
FIG. 12 is a view illustrating a terminal apparatus according to embodiments of the present disclosure.

A processor 1210, a receiver 1202, and a transmitter 1203 of a terminal for performing embodiments of the present disclosure are shown in FIG. 12. A structure of the terminal is shown in FIG. 12 for performing a method of configuring a resource region for a downlink control channel, a blind-decoding method for the downlink control channel, and signaling for this in a communication system which corresponds to the embodiments. Each of the processor 1210, a receiver 1202, and a transmitter 1203 needs to operate according to an embodiment for performing this method.

FIG. 12 is a block diagram illustrating an inner structure of a terminal according to an embodiment of the present disclosure. As illustrated in FIG. 12, a terminal of the present disclosure may include a processor 1201, a receiver 1202, and a transmitter 1203.

The processor 1201 may control a series of processes which may be executed by a terminal according to the above described embodiment of the present disclosure. For example, the processor 1201 may control an operation of configuring a resource region for a downlink control channel, a blind-decoding operation for the downlink control channel, and an operation of decoding the downlink control channel and a data channel of the terminal based on related configuration information, according to an embodiment of the present disclosure.

In an embodiment of the present disclosure, the receiver 1202 and the transmitter 1203 may be commonly referred to as transceiver. The transceiver may transmit/receive a signal to/from a base station. The signal may include control information and data. For this, the transceiver may include an RF transmitter that up-converts and amplifies a frequency of a transmitted signal, an RF receiver that low-noise amplifies a received signal and down-converts the frequency, and/or the like. Also, the transceiver outputs a signal to the processor 1201 by receiving the signal through a radio channel, and transmits a signal output from the processor 1201 through a radio channel.

The described embodiments of the present disclosure are merely presented to easily describe technical contents of the present disclosure and help the understanding of the present disclosure and are not intended to limit the scope of the present disclosure. That is, it will be clear to those skilled in the art of the present disclosure that other modified embodiments which are based on the technical contents of the present disclosure may be implemented. Further, the embodiments may be combined if necessary. Therefore, a scope of the present disclosure should not be limited to the described embodiments, and should be defined by the following appended claims and equivalents thereof.

The invention claimed is:

1. A method to decode a physical downlink control channel (PDCCH) in a wireless communication system, comprising:

receiving configuration information about a first resource set and a second resource set;

blind-decoding received signals on PDCCH resource candidates allocated in the first resource set identified based on the configuration information to search for the PDCCH resource allocated in the first resource set; and blind-decoding received signals on PDCCH resource candidates allocated in the second resource set identified based on the configuration information to search for a PDCCH resource allocated in the second resource set, wherein searching for the PDCCH resource allocated in the second resource set comprises:

identifying whether the searched PDCCH resource allocated in the first resource set overlaps with the PDCCH resource candidate allocated in the second resource set, re-determining PDCCH resource candidates such that one or more PDCCH resource candidates including the overlapped PDCCH resource candidates are excluded from the PDCCH resource candidates allocated in the second resource set configured based on the configuration information, and blind-decoding received signals on the re-determined PDCCH resource candidates to search for the PDCCH resource allocated in the second resource set.

2. The method of claim 1, wherein the PDCCH resource candidates allocated in the first resource set which exist in a first-type search space and the PDCCH resource candidates allocated in the second resource set which exist in a second-type search space are identified based on the configuration information, and wherein blind-decoding is skipped for one or more PDCCH resource candidates including a PDCCH resource candidate allocated in the second resource set in case that the PDCCH resource allocated in the first resource is searched in a PDCCH resource in which the first-type search space and the second-type search space at least partially overlap.

3. The method of claim 2, wherein a search space type designated based on the configuration information is one of a common search space, a UE-specific search space, and a UE-group search space.

4. The method of claim 1, wherein the PDCCH resource candidates allocated in the first resource set or the second resource set are sequentially blind-decoded.

5. The method of claim 1, wherein the blind-decoding received signals on PDCCH resource candidates allocated in the first resource set is initiated from a specific PDCCH resource candidate based on a terminal identifier or a slot index, and wherein the blind-decoding received signals on PDCCH resource candidates allocated in the second resource set is initiated from a specific PDCCH candidate based on a terminal identifier or a slot index.

6. The method of claim 1, wherein the first resource set and the second resource set are allocated by a unit of control-channel element (CCE), wherein the PDCCH resource candidates allocated in of the first resource set and the PDCCH resource candidates allocated in the second resource set are identified based on a CCE set including a plurality of CCEs configured based on CCE information included in the configuration information, and wherein blind-decoding for PDCCH resource candidates including an overlapped CCE is skipped in a case that the overlapped CCE exists in a CCE set of the first resource set and a CCE set of the second resource set.

7. The method of claim 1,
wherein the first resource set and the second resource set are allocated by a unit of physical resource block (PRB) pair, and
wherein blind-decoding for PDCCH resource candidates of a PRB pair including an overlapped resource is skipped in a case that there is the overlapped PRB on a PRB pair allocated in the first resource set and a PRB pair allocated in the second resource set.

8. An apparatus to decode a physical downlink control channel (PDCCH) in a wireless communication system, comprising:
a transceiver; and
a processor configured to:
receive configuration information about a first resource set and a second resource set,
blind-decode received signals on PDCCH resource candidates allocated in the first resource set identified based on the configuration information to search for the PDCCH resource allocated in the first resource set, and
blind-decode received signals on PDCCH resource candidates allocated in the second resource set identified based on the configuration information to search for a PDCCH resource allocated in the second resource set,
wherein the processor is configured to:
identify whether the searched PDCCH resource allocated in the first resource set overlaps with the PDCCH resource candidate allocated in the second resource set,
re-determine PDCCH resource candidates such that one or more PDCCH resource candidates including the overlapped PDCCH resource candidates are excluded from the PDCCH resource candidates allocated in the second resource set configured based on the configuration information, and
blind-decode received signals on the re-determined PDCCH resource candidates to search for the PDCCH resource allocated in the second resource set to search for the PDCCH resource allocated in the second resource set.

9. The apparatus of claim 8, wherein the processor is configured to:
identify the PDCCH resource candidates allocated in the first resource set which exist in a first-type search space and the PDCCH resource candidates allocated in the second resource set which exist in a second-type search space based on the configuration information; and
skip blind-decoding for one or more PDCCH resource candidates including a PDCCH resource candidate allocated in the second resource set in case that the PDCCH resource allocated in the first resource is searched in a PDCCH resource in which the first-type search space and the second-type search space at least partially overlap.

10. The apparatus of claim 9, wherein a search space type designated based on the configuration information is one of a common search space, a UE-specific search space, and a UE-group search space.

11. The apparatus of claim 8, wherein the processor is configured to sequentially blind-decode the PDCCH resource candidates allocated in the first resource set or the second resource set.

12. The apparatus of claim 8,
wherein the blind-decoding received signals on PDCCH resource candidates allocated in the first resource set is initiated from a specific PDCCH resource based on a terminal identifier or a slot index, and
wherein the blind-decoding received signals on PDCCH resource candidates allocated in the second resource set is initiated from a specific PDCCH candidate based on a terminal identifier or a slot index.

13. The apparatus of claim 8,
wherein the first resource set and the second resource set are allocated by a unit of control-channel element (CCE),
wherein the PDCCH resource candidates allocated in the first resource set and the PDCCH resource candidates allocated in the second resource set are identified based on a CCE set including a plurality of CCEs configured based on CCE information included in the configuration information, and
wherein blind-decoding for PDCCH resource candidates including an overlapped CCE is skipped in a case that the overlapped CCE exists in a CCE set of the first resource set and a CCE set of the second resource set.

14. The apparatus of claim 8,
wherein the first resource set and the second resource set are allocated by a unit of physical resource block (PRB) pair, and
wherein blind-decoding for PDCCH resource candidates of a PRB pair including an overlapped resource is skipped in a case that there is the overlapped PRB on a PRB pair allocated in the first resource set and a PRB pair allocated in the second resource.

* * * * *